US012508092B2

(12) United States Patent
Wang et al.

(10) Patent No.: US 12,508,092 B2
(45) Date of Patent: Dec. 30, 2025

(54) SURGICAL INSTRUMENT, SLAVE OPERATING EQUIPMENT, AND SURGICAL ROBOT

(71) Applicant: Shenzhen Edge Medical CO., Ltd., Guangdong (CN)

(72) Inventors: Jianchen Wang, Shenzhen (CN); Zhongbing Wu, Shenzhen (CN)

(73) Assignee: Shenzhen Edge Medical CO., Ltd., Guangdong (CN)

( * ) Notice: Subject to any disclaimer, the term of this patent is extended or adjusted under 35 U.S.C. 154(b) by 523 days.

(21) Appl. No.: 18/029,647

(22) PCT Filed: Dec. 4, 2020

(86) PCT No.: PCT/CN2020/133719
§ 371 (c)(1),
(2) Date: Mar. 30, 2023

(87) PCT Pub. No.: WO2022/068038
PCT Pub. Date: Apr. 7, 2022

(65) Prior Publication Data
US 2023/0380918 A1 Nov. 30, 2023

(30) Foreign Application Priority Data

Sep. 30, 2020 (CN) .......................... 202011063643.2
Sep. 30, 2020 (CN) .......................... 202011063664.2
(Continued)

(51) Int. Cl.
*A61B 34/37* (2016.01)
*A61B 17/28* (2006.01)
*B25J 3/00* (2006.01)

(52) U.S. Cl.
CPC .......... *A61B 34/37* (2016.02); *A61B 17/2812* (2013.01); *B25J 3/00* (2013.01)

(58) Field of Classification Search
CPC ................ A61B 34/37; A61B 17/2812; A61B 2034/305; A61B 34/71; A61B 34/70;
(Continued)

(56) References Cited

U.S. PATENT DOCUMENTS

2018/0055583 A1 3/2018 Schuh et al.
2019/0223960 A1* 7/2019 Chaplin ................. A61B 17/29
2019/0328467 A1 10/2019 Waterbury et al.

FOREIGN PATENT DOCUMENTS

EP 2313018 B1 3/2012

\* cited by examiner

*Primary Examiner* — Tan-Uyen T Ho
*Assistant Examiner* — Bridget E. Rabaglia
(74) *Attorney, Agent, or Firm* — ScienBiziP, P.C.

(57) ABSTRACT

A surgical instrument, slave operating equipment applied in the surgical instrument, and a surgical robot having the slave operating equipment. The surgical instrument includes an end effector, a drive device, and a cable. The drive device is configured to drive the end effector to move by means of the cable. The cable includes a first pair of cables and a second pair of cables which are used for driving the end effector to execute yaw movement, and a third pair of cables used for driving the end effector to execute pitch movement. The third pair of cables have a coupling relation with the first pair of cables and the second pair of cables on the end effector due to orthogonality of the pitch movement and the yaw movement. The drive device has a mechanical decoupling mechanism used for releasing the coupling relation.

20 Claims, 27 Drawing Sheets

(30) Foreign Application Priority Data

Sep. 30, 2020 (CN) .......................... 202011063671.4
Sep. 30, 2020 (CN) .......................... 202011063674.8
Sep. 30, 2020 (CN) .......................... 202011063721.9
Sep. 30, 2020 (CN) .......................... 202011066544.X

(58) Field of Classification Search
CPC ... A61B 34/30; A61B 34/35; A61B 2034/715; A61B 34/72; A61B 2034/306; A61B 2034/302; A61B 2034/303; A61B 2034/304; B25J 3/00; B25J 3/04; B25J 3/02
See application file for complete search history.

SURGICAL INSTRUMENT, SLAVE OPERATING EQUIPMENT, AND SURGICAL ROBOT

FIELD

The subject matter herein generally relates to medical instrument, in particular to a surgical instrument, a slave operating device having the medical instrument, and a surgical robot having the slave operating device.

BACKGROUND

Minimally invasive surgery refers to a surgical method of performing a procedure in a human body cavity using modern medical instruments such as laparoscopes, thoracoscopes, and so on. Compared with traditional surgery modes, minimally invasive surgery has advantages of being small in trauma, light in pain, fast in recovery, and the like.

With advances in science and technology, minimally invasive surgical technologies are increasingly mature and widely used. A typical minimally invasive surgical robot includes a Master console and as slave operating device, the master console is used for sending a control instruction to the slave operating device according to the doctor's operation to control the slave operating device, and the slave operating device is used for responding to the control instruction of the master console, and performing corresponding surgical operations.

The slave operating device usually includes a surgical instrument which are detachable to the slave operating device, the surgical instrument includes a drive device and an end effector, the end effector is configured to perform surgical operations, the drive device is configured to connect the surgical instrument to the slave operating device, and drives end effector to move by the power received driving power from the slave operating device, the drive device connected to the end effector through drive cables, and the drive device manipulates the end effector to move by the drive cables. The end effector usually has three degrees of freedom motion that are roll, pitch, and yaw, some effectors having clamp movement, wherein the yaw motion controlled by a pair of drive cables, the pitch motion is controlled by the other pair of drive cables, there are coupling relationship between the drive cables of controlling pitch motion and the drive cables of controlling pitch motion when the end effector performs pitch motion, because of the pitch motion orthogonal to the yaw motion of the end effector, that is the drive cables of controlling pitch motion are constrained to the drive cables of controlling yaw motion, therefore it is necessary to decouple the coupling relationship. The prior arts rising software to decouple, however, the algorithm is complicated by using software to decouple, because it increases the complexity of controlling program of the system, and there may be errors when collecting data by using the software to decoupling, so it may not decouple the coupling relationship precisely by using software.

SUMMARY

Based on this, in order to solve the above problems, the present disclosure provides a surgical instrument, a slave operating device having the surgical instrument, and a surgical robot having the slave operating device, wherein the surgical instrument comprising an end effector, a drive device, and cables, the drive device being configured to drive the end, effector through the cables, the cables comprising: a first pair of cables, a second pair of cables and third pair of cables, the first pair of cables and the second pair of cables being configured to drive the end effector to perform yaw motion, the third pair of cables being configured to drive the end effector to perform pitch motion, wherein the drive device comprising:

a drive unit, an end of the third pair of cables being connected to the drive unit, the drive unit being configured to manipulate the end effector to perform the pitch motion through the third pair of cables;

and a decoupling mechanism comprising a master decoupling member and a slave decoupling member, the master decoupling member being coaxial with the drive unit, the master member being configured to rotate coaxially with the drive unit and drive the slave unit to move so as to increase length of one pair of cables of the first pair of cables and the second pair of cables, and reduce length of the other pair of cables of the first pair of cables and the second pair of cables inside of the drive device, whereby the drive unit drives the end effector to perform the pitch motion.

In one embodiment, the master decoupling member is configured to drive the slave recoupling to move linearly so as to change the length of the first pair of cables and the second pair of cables inside of the drive device.

In one embodiment, the master decoupling member is configured to drive the slave decoupling to move rotationally so as to change the length of the first pair of cables and the second pair of cables inside of the drive device.

In one embodiment, the drive unit and the master decoupling member rotate in a first direction so as to increase the length of the first pair of cables in the end effector and reduce the length of the second pair of cables in the end effector, and the master decoupling member drives the slave decoupling member to be moved so as to reduce the length of the first pair of cables inside of the drive device and increase the length of the second pair of cables inside of the drive device.

In one embodiment, the drive unit and the master decoupling member rotate in a second direction which is opposite to the first direction so as to reduce the length of the first pair of cables in the end effector and increase the length of the second pair of cables in the end effector, the master decoupling member drives the slave decoupling member to be moved so as to increase the length of the first pair of cables inside of the drive device and reduce the length of the second pair of cables inside of the drive device.

In one embodiment, one end of the slave decoupling member is provided with a first guide portion, the other end of the decoupling member is provided with a second guide portion, the first pair of cables extend to the end effector after being guided by the first guide portion, the second pair of cables extend to the end effector after being, guided by the second guide portion.

In one embodiment, the drive unit and the master decoupling member rotate the first direction or the second direction, such that an amount of the length change of the first pair of cables or the second pair of cables on the end effector is four times to a movement distance of the slave decoupling member within the drive device.

In one embodiment, the drive device further comprises a first guide pulley and a second guide pulley, the first pair of cables is guided by the first guide pulley and then connected to the end effector after being guided by the first guide portion, and the second pair of cables is guided by the second guide pulley and then connected to the end effector after being guided by the second guide portion.

In one embodiment, the movement direction of the slave decoupling member is parallel to a part of the first pair of cables between the first guide pulley and the first guide portion of the slave decoupling member.

In one embodiment, the movement direction of the slave decoupling member is parallel to the part of the second pair of cables between the second guide pulley and the second guide portion of the slave decoupling member.

In one embodiment, the drive device further comprises a third guide pulley and a fourth guide pulley, the third guide pulley and the first guide pulley are respectively located on two sides of the first guide portion of the slave decoupling member, the fourth guide pulley and the second guide pulley are respectively located on two sides of the second guide portion of the slave decoupling member, a portion of the first pair of cables between the first guide portion and the end effector extends to the end effector after being guided by the third guide pulley, and a portion of the second pair of cables between the second guide portion and the end effector extends to the end effector after being guided by the fourth guide pulley.

In one embodiment, the direction of movement of the slave decoupling member is substantially parallel to a part of the first pair of cables between the first guide portion and the third guide portion of the slave decoupling member.

In one embodiment, the movement direction of the slave decoupling member is parallel to the part of the second pair of cables between the second guide portion and the fourth guide pulley of the slave decoupling member.

In one embodiment, the slave decoupling member comprises a plurality of decoupling cables, the master decoupling member is connected with the slave decoupling member through the decoupling cables, and the master decoupling member is configured to drive the slave decoupling member through the decoupling cables.

In one embodiment, the master decoupling member has a cam, the slave decoupling member has an opening accommodating the cam, the rotational movement of the master decoupling member causes the cam contacted to edge of the opening so as to drive the slave decoupling member to move.

In one embodiment, the master decoupling member is fixedly connected or integrated with the slave decoupling member.

In one embodiment, the radius of the master decoupling member is less than the radius of the drive unit.

In one embodiment, the first pair of cables comprises a first drive cable and a second drive cable, the first guide pulley having two side-by-side guide pulleys for guiding the first drive cable and the second drive cable, respectively.

In one embodiment, an included angle between the parts of the first drive cable and the second drive cable between the first guide portion and the third guide pulley and the first plane is equal, and the first plane passes through the center of the third guide pulley and is perpendicular to the axis of the third guide pulley.

In one embodiment, the speed of length change of the first drive cable and the second drive cable are directly proportional to the rotational linear velocity of the main decoupling member due to the movement of the slave decoupling member.

A slave operating device includes a robotic arm and the surgical instrument as above-mentioned in the claims, the surgical instrument being mounted on the robotic arm for manipulating the surgical instrument to move.

A surgical robot includes a master operation device and the above-mentioned slave operation device, and the slave operation device performs a corresponding operation according to an instruction of the master operation device.

In the present disclosure, the mechanical structure is used to relieve the coupling relationship between the drive cable for manipulating the pitching motion of the end effector and the drive cable for manipulating the yaw movement of the end effector, so that the coupling relationship between the drive cable and the drive cable can be released very accurately and controllably, and the program algorithm of the whole surgical robot can be reduced by using mechanical decoupling, so that the operation of the surgical robot is more stable.

DETAILED DESCRIPTION

For ease of understanding of the present application, the present application will be described more fully hereinafter with reference to the associated drawings. Preferred embodiments of the present application are set forth in the accompanying drawings. This application may, however, be embodied in any different forms and is not limited to the embodiments described herein. Rather, these embodiments are provided for the purpose of providing a more thorough and thorough understanding of the disclosure of the present application.

It should be noted that when a member is referred to as being "disposed on" another member, it may be directly on the other member or intervening members may also be present. When a member is considered to be "connected" to another member, it may be directly connected to another member or intervening members may be present at the same time. When a member is considered to be "coupled" to another member, it may be directly coupled to another member or intervening members may be present at the same time. As used herein, the terms "vertical", "horizontal", "left", "right" and the like are intended for purposes of illustration only and are not intended to be limiting. As used herein, the terms "distal end" and "proximal end" are common terms in the art of interventional medical devices, where "distal end" refers to the end far away from the operator during the surgical procedure, and the "proximal end" refers to the end close to the operator during the surgical procedure.

Unless defined otherwise, all technical and scientific terms used herein have the same meaning as commonly understood by one of ordinary skill in the art. The terminology used herein is for the purpose of describing particular embodiments only and is not intended to be limiting of the invention. As used herein, the term "and/or" includes all combinations of one or more of the associated listed items.

Figure 1:
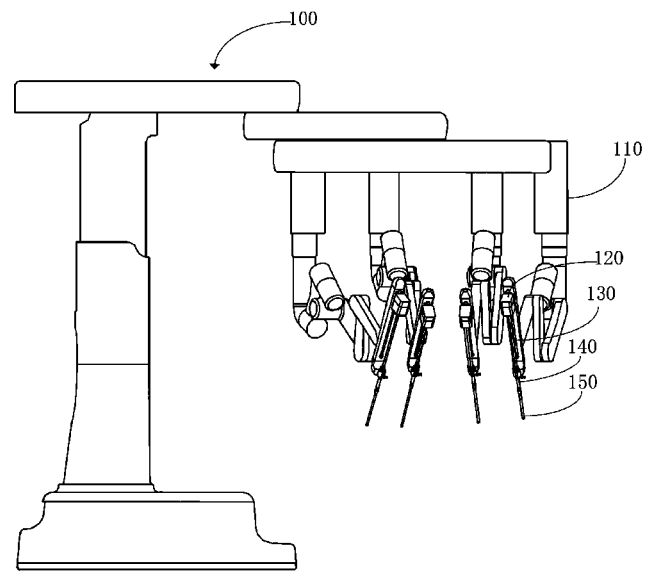
FIG. 1 is a schematic structural view of a slave operating device of a surgical robot according to an embodiment.
Figure 2:
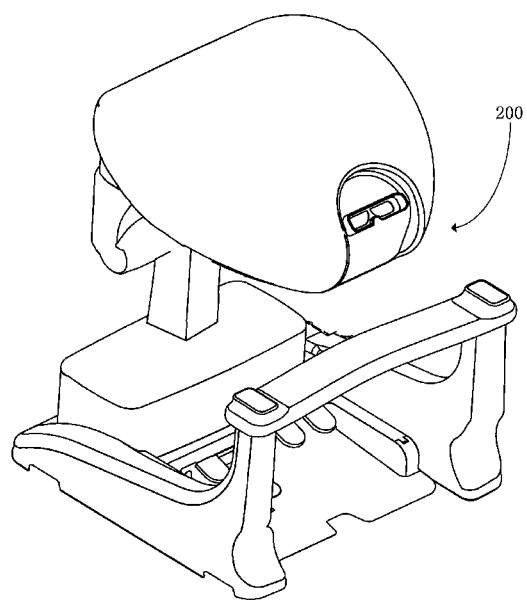
FIG. 2 is a schematic structural view of a master operating device of a surgical robot according to an embodiment.

A minimally invasive surgical robot generally includes a slave operating device and a master operating device. A slave operating device 100 of an example of present disclosure as shown in FIG. 1, a master operating device 200 of an example of present disclosure as shown in FIG. 2, a surgeon controls the slave operating device 100 by using the master operating device 200, the slave operating device 100 performs surgery according to commands sent by the master operating device 200. The master operating device 200 and the slave operating device may be placed in an operating room or may be placed in different rooms, the master operating device 200 and slave operating device 100 may be distanced remotely, for example, the master operating device 200 and the slave operating device 100 are located in different cities. The master operating device 200 and the slave operating device 100 transmit data mutually by wire or wireless, for example, The master operating device 200 and the slave operating device 100 transmit data mutually by wire when both of the master operating device 200 and the slave operating device 100 located in an operating room, the master operating device 200 and the slave operating device 100 transmit data mutually by 5G wireless data transmission.

Figure 3:
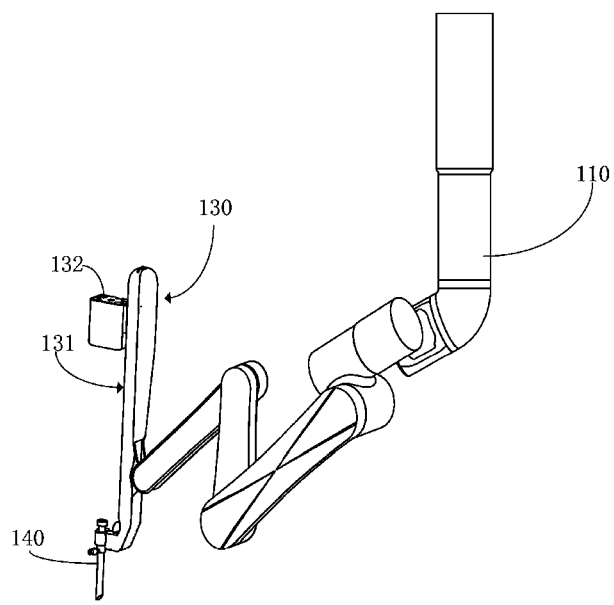
FIG. 3 is a schematic structural view of a robot arm of a slave operating device according to an embodiment.

Referring to FIG. 1, the operating device 100 includes a plurality of robotic arms 110, each of the robotic arms 100 includes a plurality of joints and an instrument holder 130, the plurality of joints are linked to effect multiple degrees of freedom of motion of the instrument holder 130, an instrument 120 is mounted on the instrument holder 130, the instrument 120 is extending to a human body via a cannula 140 fixed on the distal of the Instrument holder 130. The instrument; 120 is detachably mounted on the instrument holder 130, such that different type of instruments 120 can be replaced, cleaned or sterilized. Referring to FIG. 3, the instrument holder 130 includes an instrument holding body 131 and an instrument mounting bracket 132, the instrument mounting bracket 132 is configured to mount the instrument 120, the instrument mounting bracket 132 may be sliding on the instrument holding body 131 so as to drive the instrument 120 to insert or retract along the instrument body 131.

Figure 4:
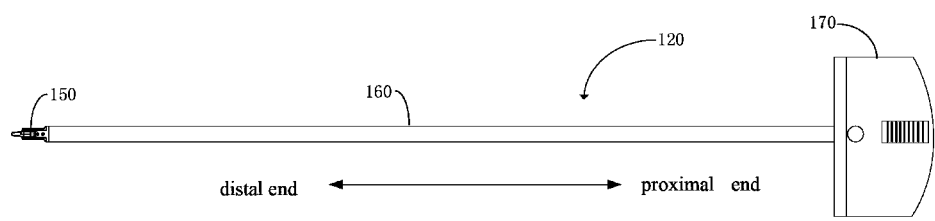
FIG. 4 is a schematic structural view of a surgical instrument according to an embodiment.

Referring to FIG. 4, the instrument 140 includes a drive device 170 located on proximal end of the instrument 140, an end effector located on the distal end, of the instrument 140, and an elongated shaft 160 between the drive device 170 and the end effector 150. The drive device 170 is configured to connect to the instrument mounting bracket 132, the instrument mounting bracket 132 has a plurality of actuators (not shown), the plurality of actuators are coupled with the drive device 170 so as to transfer driving power from the actuators to the drive device 170. The elongated shaft 160 is used for connecting the drive device 170 and the end effector 150, the elongated shaft 160 is hollow for the drive cables to pass through the drive device 170 drives the end effector 150 to move by the drive cables, such that the end effector 150 performs a related surgery operation.

Figure 5A:
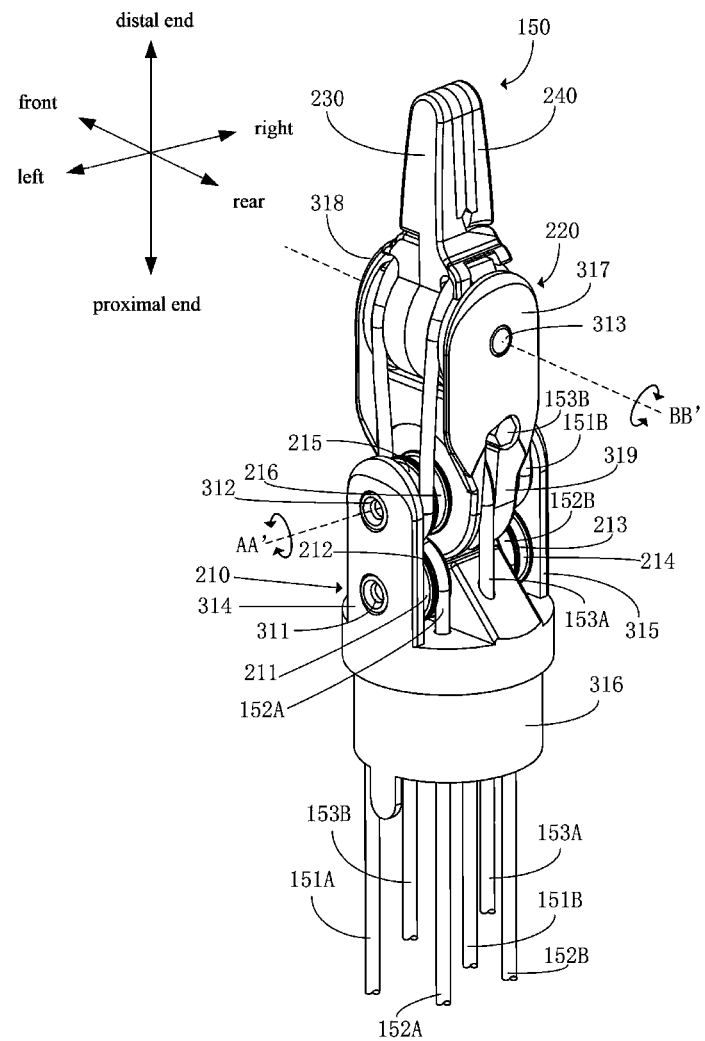
FIGS. 5A-5D are schematic structural views of end effector according to an embodiment.

FIGS. 5A-5D are schematic structural views of an end effector 150 according to an embodiment of the present disclosure. As shown in FIG. 5A, the end effector 150 includes a first support member 210 and a second support member 220, a distal end of the first support member 210 has a first pillar 314 and a second pillar 315, a proximal end of the first support member 210 includes a chassis 316, an end of the chassis 316 is connected to the shaft. The first pillar 314 and the second pillar 315 are extending from the other end of the chassis 316 toward the distal end of the end effector 150, such that the first pillar 314, the second pillar 315 and the chassis 316 form a clevis.

A first pin 311 and a second pin 312 are disposed between the first pillar 314 and the second pillar 315, an end of the first pin 311 is fixed to the first pillar 314, the other end of the first pin 311 is fixed to the second pillar 315, similarly, an end of the second pin 312 is fixed to the first pillar 314, the other end of the second pin 312 is fixed to the second pillar 315. The first pin 311 and the second pin are disposed side by side on the first pillar 314 and the second pillar 315, wherein the first pin 311 is closer to the chassis 316 of the first, support member 210 than the second pin 312.

Figure 5B:
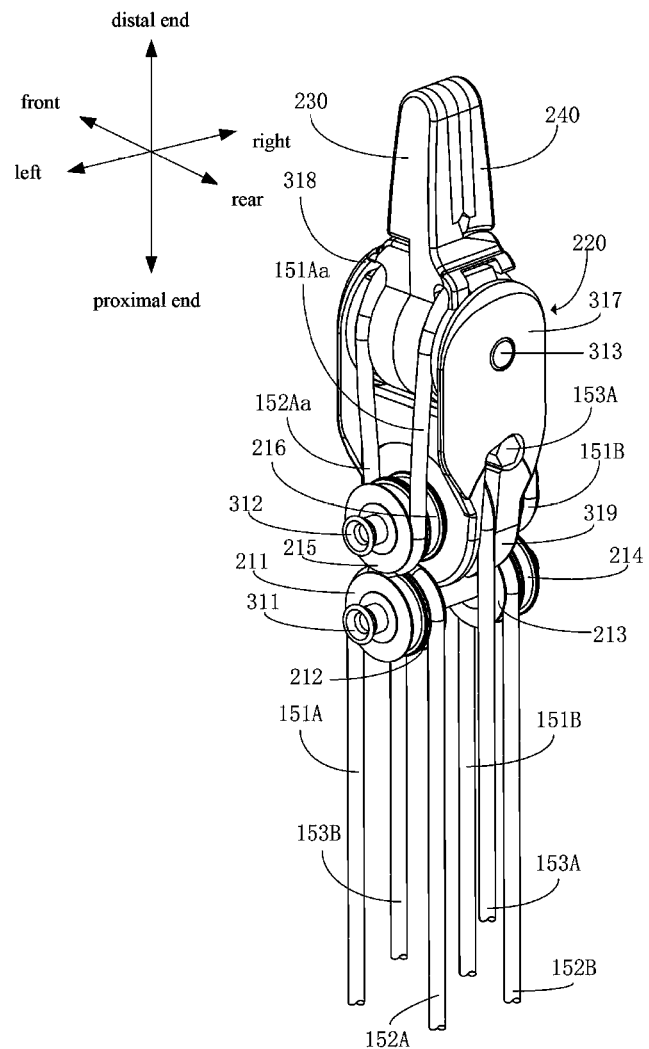
Figure 5C:
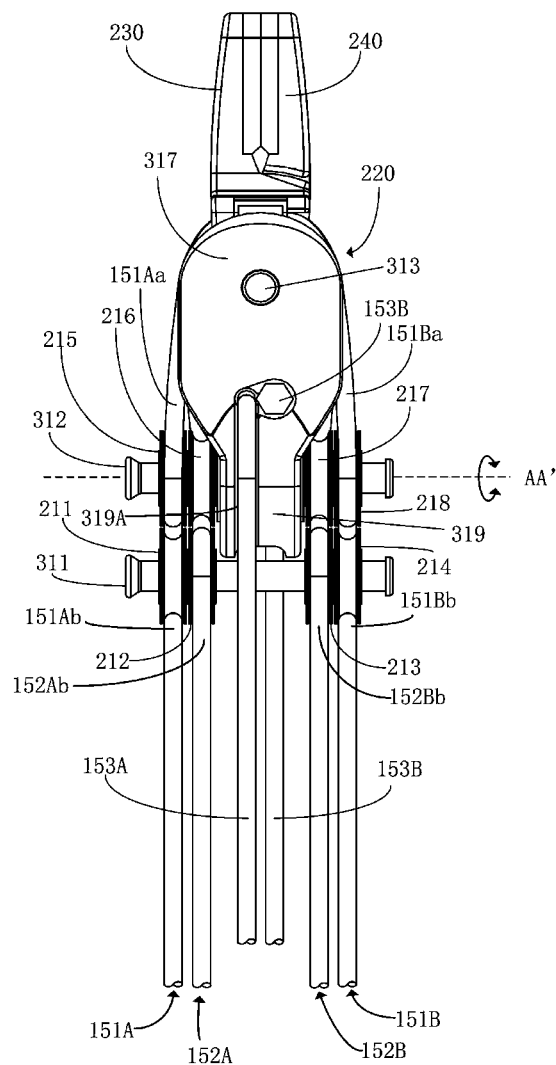

The first support member 210 is not shown in FIG. 5B and FIG. 5C for showing the proximal structure of the end effector 150 more clear. Referring to FIG. 5B and FIG. 5C, a first pulley group is disposed on the first pin 311, the first pulley group includes a first pulley 211, a second pulley 212, a third pulley 213 and a fourth pulley 214 that are disposed on the first pin 311. A second pulley group is disposed on the second pin 312, the second pulley group includes a fifth pulley 215, a sixth pulley 216, a seventh pulley 217 and an eighth pulley 218. The pulleys 211,212,213,214,215,216, 217,218 are used for guidance of the drive cables. Because all pulleys for guiding the drive cables are located on the first support member 210, there is no pulley on the second support member 220, therefore, size if the second support member 220 can be made smaller, such that size of the end effector 150 can be smaller, in addition, there is no risk of falling off of pulleys.

The second support member 220 includes a third pillar 317, a fourth pillar 318 and a pitch wheel 319, the third pillar 317 and the fourth pillar 318 extending from the pitch wheel 319 toward the distal end of the end effector 150, the third pillar 317, the fourth pillar 318 and the pitch wheel form a clevis. The pitch wheel 319 of the second support member 220 is mounted on the second pin, the second support member 220 may rotate around an axis AA' of the second pin 312 so as to effect the pitch motion of the end effector.

A third pin 313 disposed between the third pillar 317 and the fourth pillar 316, an end of the third pin is fixed to the third pillar 317, the other end of the third pin 313 is fixed to the fourth pillar 318, the third pin 313 is orthogonal to the first pin 311 and the second pin 312. The end elector includes a first; aw 230 and the second jaw 240, the first jaw 230 and the second: aw are pivotally mounted on the second support member through the third pin, the first jaw 230 and the second jaw 240 can rotate around an axis BB' of the third pin 313 so as to effect opening and closing and/or yaw motion, the first jaw 230 and the second jaw 240 can be a grasper for grasping tissue, stapler, or bipolar forceps.

Referring to FIGS. 5A-5D, the direction identifier shown in FIGS. 5A and 5B are used for describing the winding ways of the drive cables on the end effector. The distal and proximal of the direction identifier respectively refer to the distal direction and proximal direction of the end effector 150, front, rear, left and right of the direction identifier respectively refer to front direction, rear direction, left direction and right direction of the ends effector in the view of FIG. 5A and FIG. 5B, although there is no direction identifier in other FIGS, but it is easy to derive the direction of the end effector according to FIG. 5A and FIG. 5B, the drive cables disposed on the end effector 150 includes a first pair of cables, a second pair of cables and a third pair of cables, the first pair of cables and the second pair of cables are used for manipulating opening and closing and/or yaw motion of the end effector 150, the third pair of cables are used for manipulating pitch motion of the end effector 150. The first pair of cables include a first drive cable 151A and a second drive cable 151B, the end of the first drive cable 151A and the end of the second drive cable 151B may be connected together or separated, so do the second pair of cables and the third pair of cables. The second pair of cables include a third drive cable 152A and a fourth drive cable 152B, the third pair of cables include a fifth drive cables 153A and a sixth drive cable 153B. Referring to FIG. 5E, each of the drive cables include throe segments, for example, the first drive cable 151A include a first segment 151A1, a second segment 151A2, and a third segment 151A3, the first segment 151A1 is extending into the drive device, the second segment 151A2 is configured to the end effector 150, the third segment 151A3 is a rigid deformable 151A3 which is disposed between the first segment 151A1 and the second segment 151A2, such that the structure has higher transmission efficiency than using entire cable, and is hard to occur a situation of multiple drive cables intertwisted, in other embodiments, the drive cables may also be a complete and unsegmented cable.

On the side of end effector 150, the way of the first pair of cables wound around the first pulley group and the second pulley group is contra to the way of the second pair of cables wound around the first pulley group and the second pulley group, the way of the first drive cable 151A wound around the first pulley group and the second pulley group is same with the second drive cable 151B wound around the first pulley group and the second pulley group, the third drive cable 152A wound around the first pulley group and the second assembly is same with the way of fourth drive cable 152B wound around the first pulley group and the second assembly. Specifically, the proximal end of the first drive cable 151A is connected to a drive unit inside of the drive device 170, the distal end of the first drive cable 151A is extending to the distal end of the end effector 150 and fixed to the first jaw 230 via being guided by the front portion of the first pulley 211 and the rear portion of the fifth pulley 215. The distal end of second drive cable 151B is extending to the distal end of the end effector 150 and fixed to the first jaw 230 via being guided by the front portion of the fourth pulley 214 and the rear portion of the eighth pulley 218. The third drive cable 152A is extending to the distal end of the end effector 150 and fixed to the second jaw 240 via being guided by the rear portion of the second pulley 212 and the front portion of the sixth pulley 216. The distal end of the fourth drive cable 152B is extending to the distal end of the end effector 150 and fixed to the second jaw 240 via being guided by the rear portion of the third pulley 213 and the from portion of the seventh pulley 217.

The first drive 151A and the second drive cable 151B drive the first jaw 230 to rotate around the axis BB'. The third drive cable 152A and the fourth drive cable 152B drive the second jaw 240 to rotate around the axis BB', wherein the first drives cable 151A, the second drive cable 151B, the third drive cable 152A and the fourth drive cable 152B drive the first jaw 230 and the second jaw 240 to perform the opening and closing movement and/or the jaw motion.

the proximal ends of the fifth drive cable 153A and the sixth drive cable 153B are connected to the drive device 170, the distal end of the fifth drive cable 153A and the sixth drive cable 153B are received in a ring groove of the pitch wheel 319, the terminal ends of the fifth drive cable 153A and the sixth drive cable 153B are fixed in the second support member 220, the fifth drive cable 153A and the sixth drive cable 153B drive the second support 220 to rotate around axis AA', whereby rotational movement of the second support member 220 causes the jaw 230 and jaw 240 to perform pitch motion.

The structure and way of winding of drive cable of the end effector 150 are different from end effector of prior art, the first pulley group of the end effector of the prior art is mounted on the first support member, the second pulley group is mounted on the second support member, the second pulley group performs pitch motion along with the second support member. In addition, the way of winding of the drive cable is different from the prior art, as shown in FIGS. 5A-5D, the first drive cable 151A has a first part, cable 151Aa which is between the fifth pulley 215 and the first jaw 230, the second drive cable 151B has a second portion cable 151Ba which is between the eighth pulley 218 and the first jaw 230, the third drive cable 152A has a third part cable 152Aa which is between the sixth pulley 216 and the second jaw 240, the fourth drive cable 152B has a fourth portion cable 152Ba which is between the seventh pulley 217 and the first jaw 240. When the end effector 150 performs pitch motion, the first portion cable 151Aa and the second portion cable 151Ba are always on a side of a plane M, the third portion cable 152Aa and the fourth portion cable 152Ba are always on the other side of plane M, the plane M which is passing through the axis AA' of the second pin 312 and perpendicular to the axis BB' of the third pin 313, whereby winding of the first pair of cables and the second pair of cables on the end effector 150 is relatively simple, neat and easy to assemble.

Figure 5D:
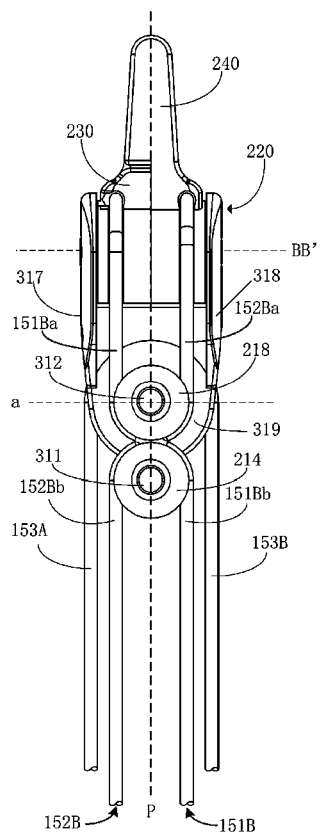
Figure 5E:
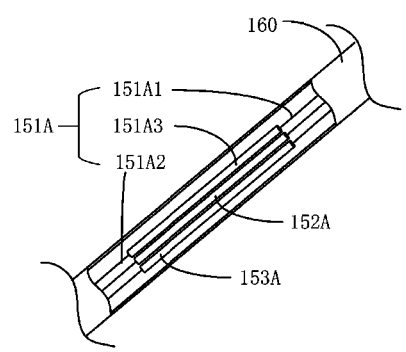
FIG. 5F is a schematic structural view of drive cables inside of an elongated shaft.

As shown in FIG. 5C and FIG. 5D, the first drive cable 151A has a fifth portion cable 151Ab which is between the first support member 210 and the first pulley 211 (the first support member 210 is not shown in FIG. 5C and FIG. 5D for showing drive cables), the second drive cable 151B has a sixth portion cable 151Bb which is between the first support member 210 and the fourth pulley 214, the third drive cable 152A has a seventh portion cable 152Ab which is between the first support member 210 and the second pulley 213, the fourth drive cable 152B has a eighth portion cable 152Bb which is between the first support member 210 and the third pulley 213, the fifth portion cable 151Ab and the sixth portion cable 151Bb are on a side of a plane P, the seventh drive cable 152Ab and the eighth portion cable 152Bb are on the other side of the plane P, the P is passing through the axis of the first pin 311 and the axis of the second pin 312.

Figure 6A:
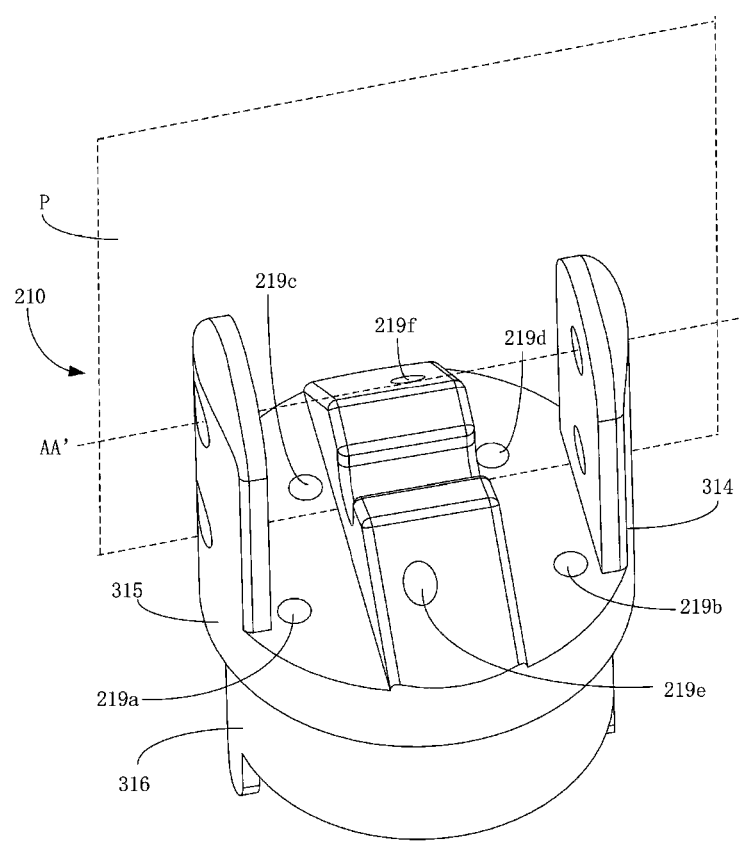
FIG. 6A is a perspective view of a first support member of an effector according to an embodiment.
Figure 6B:
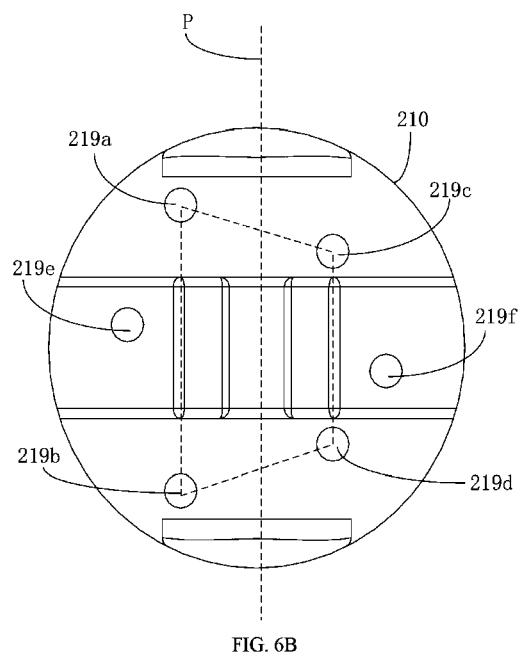
FIG. 6B is a plan view of a support member of an effector according to an embodiment.

Referring to FIG. 6A and FIG. 6B, the chassis 316 of the first support member includes a plurality of holes configured for the drive cables to pass through, the plurality of holes include a first hole 219a used for the filth portion cable 151Ab to pass through, a second hole 219b used for the sixth portion cable 151Bb to pass through, a third hole 219c used for the seventh portion cable 152Ab, a fourth hole 219d used for eighth portion cable 152Bb, a fifth hole 219e used for the fifth drive cable 153A to pass through, and a sixth hole 219f used for the sixth drive cable 153B to pass through. To cause the change of the first drive cable 152A, the second drive cable 152B, the third drive cable 152A and the fourth drive cable 152B is same when the end effector 150 performs pitch motion (such as length increasing or decreasing simultaneously), the first hole 219a and the second 219b are located on a side of the plane P, the third hole 219c and the fourth hole 219d are located on the other side of the plane P, a straight line which is passing through the center of the of the first hole 219a and the second hole 219b is parallel to a straight line which is passing through the center of the third hole 219c and the fourth hole 219d, the drive cables straightly extend to the first pulley group via passing through holes of the chassis 316 because of the parallel relationship, such that the driving efficiency of the drive cables is efficient.

Referring to FIG. 6B, the first hole 219 a, the second hole 219b, the third hole 219c, and the fourth hole 219d are respectively located on four vertices of a trapezoid, whereby the first drive cable 151A and the second drive cable 151B respectively pass through the first pulley 211 and the fourth pulley 214, the third drive cable 152A and the fourth drive cable 152B respectively pass through the second pulley 212 and the third pulley 213. To cause the loss of driving power of the fifth drive cable 152A and the sixth drive cable 153B is minimum when driving pitch motion of the end effector 150, the fifth hole 219e and the sixth bole 219f are located outside of the trapezoid formed by the first bole 219a, the second hole 219b, the third hole 219c, and the fourth hole 219d.

Figure 6C:
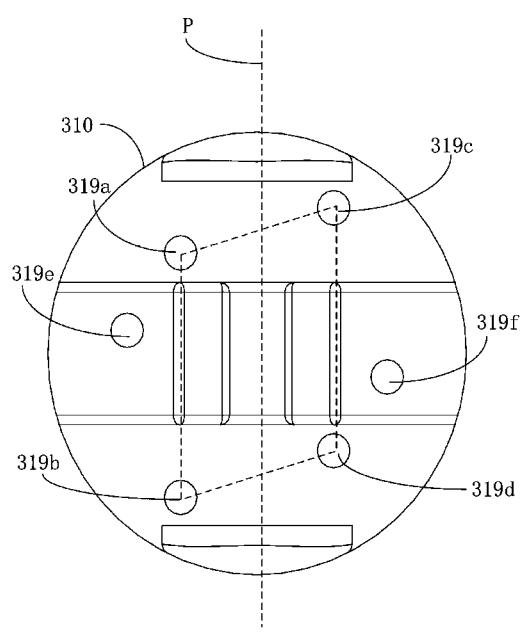
FIG. 6C is a plan view of a support member of an effector according to another embodiment.

In an embodiment, referring to FIG. 6C, the first hole 219 a, the second hole 219b, the third hole 219c, and the fourth hole 219d are respectively located on four vertices of a parallelogram, the fifth hole 219e and the sixth hole 219f are located outside of the parallelogram formed by the first bole 219a the second hole 219b, the third hole 219c, and the fourth hole 219d.

In prior arts, the fifth portion cable of the first drive cable and the sixth portion cable of the second drive cable are located on different side of the plane P, the seventh portion cable of the third drive cable and the eighth portion cable of the fourth drive cable are located on the different side of the plane P, the hole used for the first drive cable to pass through and the hole used for the second drive cable to pass through located on different side of the plane P, the hole used for the third drive cable to pass through and the hole used for the fourth drive cable to pass through are located on the different side of the plane R Because the structure and way of winding of the end effector of present disclosure is different from the prior arts, the end effector of present disclosure is safer compared to the prior arts, the drive cables and the pulleys of present disclosure are not easy to fall off compared to the prior arts, assembly of the end effector of present disclosure is easy compared to the prior arts, the end effector of present disclosure is compact. Although the instrument of the present disclosure has the above advantages, but new challenges come with the instrument of present disclosure, that is the drive device of the prior art cannot drive the end effector of present disclosure, more specifically, the method of decoupling the coupling relationship between the third pair of cables with the first pair of cables and the second pair of cables of the prior arts is no longer suitable for end effector of present disclosure.

The coupling relationship between the third pair of cables with the first pair of cables and/or the second pair of cables of the end effector 150 is described as following. As shown in FIG. 5C, a contact point where the first portion cable 151Aa is off the pulley 215, a contact point where the second portion cable 151Ba is off the eighth pulley 218, a contact point where the third portion cable 152Aa is off the sixth pulley 216, a contact point where the fourth portion cable 152Ba is off the seventh pulley 217 are on a plane a, the plane a passes through the first axis AA' and perpendicular to the plane P.

Figure 7A:
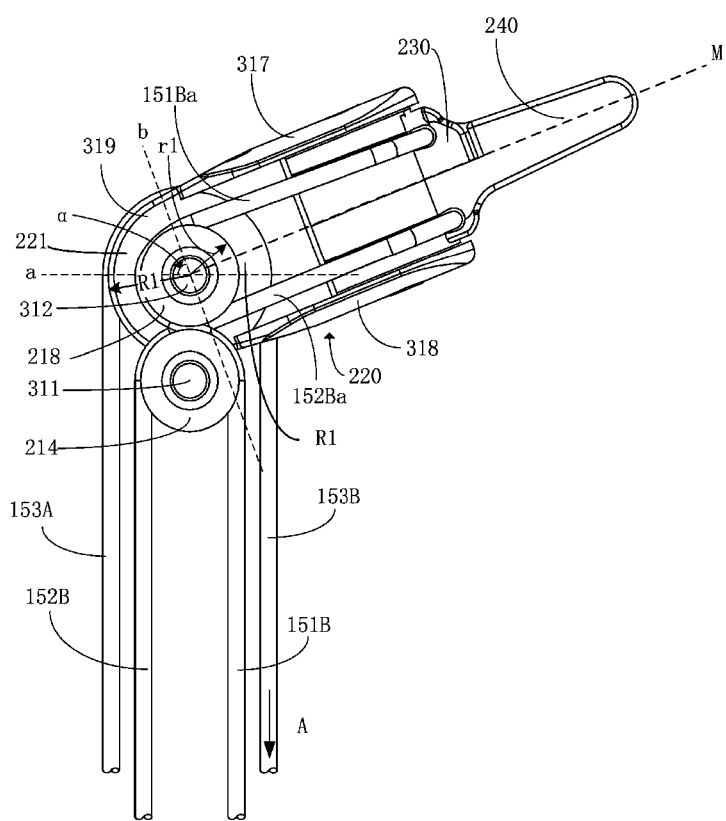
FIGS. 7A-7B are schematic views of a pitch state of the end effector according to the embodiment shown in FIG. 5A.
Figure 7B:
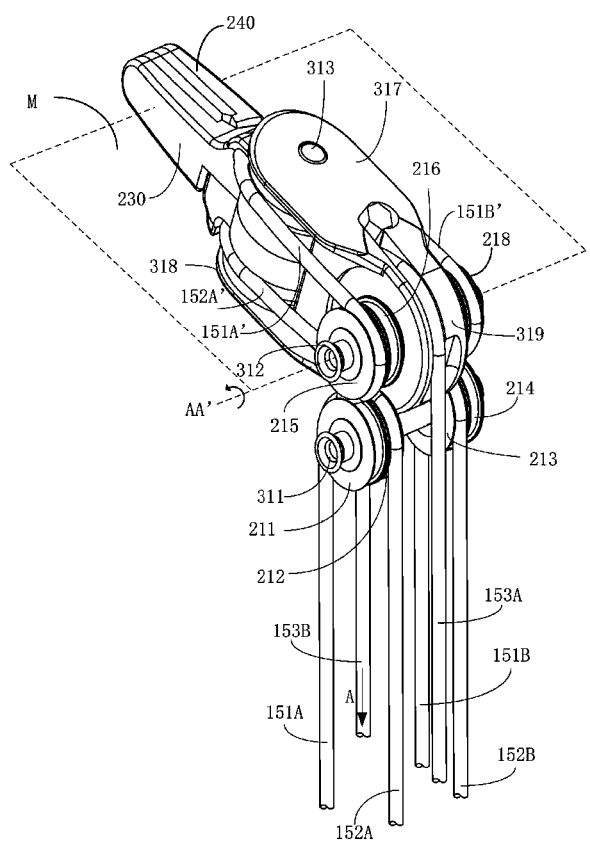

When the end effector 150 performs pitch motion, the drive device 170 pulls the fifth drive cable 153A or the sixth drive cable 153B, so as to movement of the second support member 220 causes the first jaw 230 and the second jaw 240 rotate around the first axis AA' to perform pitch motion. As shown in FIG. 7A and FIG. 7B, the drive device 170 pulls the sixth drive cable 153B, so as to the second support member 220, the first jaw 230 and the second jaw 240 performs pitch motion around the first axis AA', if the end effector 150 is only needed to perform pitch motion, it is necessary to keep length of the first portion cable 151Aa, the second portion cable 151Ba, the third portion cable 152Aa and the fourth portion 153Ba to be conserved, otherwise causing the yaw motion or the opening and closing movement of the end effector.

Figure 8A:
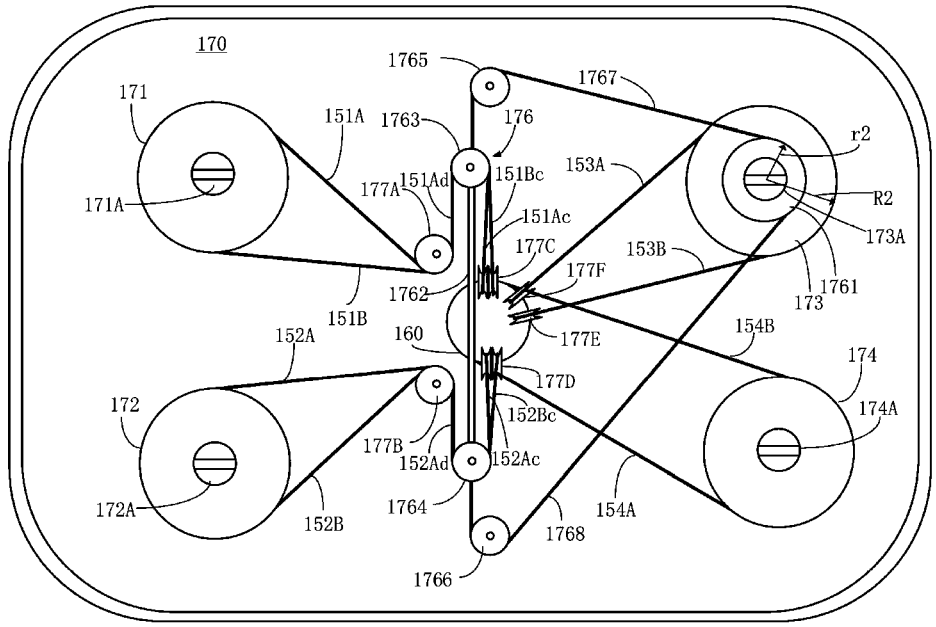
FIG. 8A is a schematic view of a drive device according to an embodiment.

In the process of the end effector 150 rotates from the straight state of shown in FIGS. 5A-5D to the pitch state shown in FIGS. 7A-7B, when the drive device 170 pulls the sixth drive cable 153B, if a target pitch angle that the end effector 150 needs to be rotated is α, the plane a shown in FIG. 5D needs to rotate a α angle so as to be the position of plane h shown in FIG. 7A, if radius of the first pulley group and the second pulley group are r1, to effect the target pitch angle of the effector 150 to be rotated is α, the wrap length of the first drive cable 151A wound around the fifth pulley 215 should be increased L, the wrap length of the second drive cable 151 wound around the eighth pulley 218 should be increased L, the $L=\alpha * r_1$, the wrap length of the third drive cable 152A and the fourth drive cable 152B respectively wound around the sixth pulley 216 and the seventh pulley 217 should be reduced. L simultaneously. However, as shown in FIG. 8A, in the drive device, the first drive cable 151A and the second drive cable 151B are wound around a rotatable first drive unit 171 in a contrary way, the third drive cable 152A and the fourth drive cable 152 are wound around a rotatable second drive unit 172 in a contrary way, both of the first drive unit 171 and the second drive unit 172 are rotatably mounted the rotational axis, therefore the drive unit 171 and the second drive unit 172 cannot be translated, therefore the first drive cable 151A and the second drive cable 151B cannot be increased simultaneously or reduced simultaneously just only by rotation of the first drive unit 171, the third drive cable 152A and the fourth drive cable 152B cannot be increased simultaneously or reduced simultaneously just only by rotation of the second drive unit 172. As mentioned above, it is necessary that the length of the first drive cable 151A and the second drive cable 151B on the end effector 150 are increased simultaneously or reduced simultaneously, and the length of the third drive cable 152A and the fourth drive cable 152B on the end effector 150 are increased simultaneously or reduced simultaneously if the end effector 150 performs pitch motion, therefore movement of the third pair of cables is constrained to the first pair of cables and the second pair of cables.

The relationship of change of one element constrained to another element is referred to as a coupling relationship, that is, there is a coupling relationship between one element with another element. Regarding to the first pair of cables, the second pair of cables and the third pair of cables, a constrained relationship may be that the third pair of cables is constrained to the first pair of cables and/or the second pair of cables, therefore causing the third pair of cables cannot be moved, whereby the end effector cannot perform pitch motion, or movement of one of the first pair of cables, the second pair of cables or the third pair of cables may cause unexpected movement of another pair of cables, whereby the end effector cannot perform expected operation, for example, when the third pair of cables drive pitch motion of the end effector, because the coupling relationship between the third pair of cables with the first pair of cables and/or the second pair of cables, the movement of the third pair of cables causes the first pair of cables and/or the second pair of cables to be moved, whereby the pitch motion of the end effector causes the closing and opening movement and/or the yaw motion for the end effector, causing the pitch motion and the opening and closing and/or yaw motion effect to each other, the pitch motion and the opening and closing and/or yaw notion are not independent, so that the end effector cannot properly perform surgical operation. It is necessary that decouple the coupling relationship between the third pair of cables and the first pair of cables and/or the second pair of cables, so as to movement of the third pair of cables are no longer constrained to the first and/or the second pair of cables, the movements of the third pair of cables the first and/or the second pair of cables are independent to each other, without interference or impact on each other, decoupling the coupling relationship between the third pair of cables and the first and/or second pair of cables referred to as decoupling.

Regarding to how to decouple the coupling relationship, a decoupling method of prior arts is by using software algorithm, that is the master operating device 200 controls movement of the first and the second pair of cables by the first and the second drive unit when the master operating device 200 controls the third pair of cables to move by the third drive device, whereby wrapped angle length of the first and the second pair of cables eat pulleys increased or reduced along with movement of the third pair of cables, if decoupling by using the software method, it is necessary that the first cable portion 151Aa and the second cable portion 151Ba of the first pair of cables on the end effector are located on different side of the plane M, such that the first (hive cable 151A and the second drive cable 151B forms a loop crossing the plane M, the third drive cable 152A and the fourth drive cable 152B forms the other loop crossing the plane M. However, as shown in FIG. 5A of the present disclosure, the first cable portion 151Aa and the second cable portion 151Ba of the first pair of cables are located on the same side of the plane M, the third cable portion 153Aa and the fourth cable portion 153Ba of the second pair of cables are located on the same, side of the plane M, the software decoupling method cannot decouple the end effector of the present disclosure. In addition, the method of the software algorithm decoupling may cause complexity of control of surgical robot, and the he method of the software algorithm decoupling may cause each of drive units of the drive device dependent to each other, more specifically, the driving has three drive units for driving the three pairs of cables respectively, in an ideal condition each of the three drive units is independent to another drive unit, when a software algorithm is used for decoupling, the three drive units need to be controlled to move together at the same time, so that the three drive units lose independence, and control errors may occur.

The present disclosure provides a mechanical decoupling solution, and a mechanical decoupling mechanism is provided in the drive device 170 of the surgical instrument 120, thereby avoiding the disadvantage of software algorithm decoupling.

A drive device 170 of an embodiment of present disclosure as shown in FIG. 8A, the drive device 170 is suitable for driving, the end effector 150 shown in FIG. 5A, the drive device 170 includes a first drive unit 171 and a second drive unit 172 for driving the opening and closing and/or yaw motion of end effector 150, a third drive unit 173 for driving the pitch motion of the end effector 150, and a fourth unit 174 for driving roll of the elongated shaft 160. The first drive cable 151A and the second drive cable 151B of the first pair of cables are wound around the first drive unit 171 in opposite way, the third drive cable 152A and the fourth drive cable 152B of second pair of cables are wound around the second drive unit 172 in opposite way, the fifth drive cable 153A and the sixth drive cable 153B of second pair of cables are wound around the third drive unit 173 in opposite way, the seventh drive cable 154A and the eighth drive cable 154B of second pair of cables are wound around the fourth drive unit 174 in opposite way.

When a driving shaft 171A of an actuator inside of the instrument mounting bracket 132 drives the first drive unit 171 to rotate, whereby the first drive unit 171 pulls or releases the first drive cable 151A or the second drive cable 151B so as to cause the first jaw 230 to pivot around the third pin 313, a driving shaft 172A of an actuator drives the second drive unit 172 to rotate, whereby the second drive unit 172 pulls or releases the third drive cable 152A or the fourth drive cable 152B so as to cause the second jaw 240 to pivot around the third pin 313, the first jaw 230 and the second jaw 240 pivoting around the pin 313 cause the opening and closing and/or yaw motion. When a driving, shaft 173A of an actuator imide of the instrument mounting bracket 132 drives the third drive unit 173 to rotate whereby the third drive unit 173 pulls or releases the fifth drive cable 152A or the sixth drive cable 151B so as to cause the second support member 220 to pivot around the axis AA', such that effects the pitch motion of the end effector 150. When a driving shaft 174A of an actuator inside of the instrument mounting bracket 132 drives the fourth drive unit 174 to rotate, whereby the fourth drive unit 174 pulls or releases the seventh drive cable 154A or the eighth drive cable 154B so as to effect roll movement of the elongated shaft 160.

The drive device 170 includes a decoupling mechanism which is used for decoupling the coupling relationship between the third pair of cables and the first pair of cables, the second pair of cables on the end effector 150, the decoupling mechanism includes a master decoupling member 1761 and a slave decoupling member 176, the slave decoupling member 176 includes a sliding frame 1762, a first guide portion 1763 and a second guide portion 1764 connected to two ends of sliding frame 1762, the master decoupling member 161 is connected to the sliding frame 1762 via a first decoupling cable 1767 and a second decoupling cable 1768, the master decoupling member 1761 drives the first decoupling cable 1767 and the second decoupling cable 1768 so as to manipulate movement of the slave decoupling member 1768. The first decoupling cable 1767 and the second decoupling cable 1768 are wound around the master decoupling member 1761 in opposite way, the master decoupling member 1761 rotates the third drive unit 173 in same angular velocity, the master decoupling member 1761 and the third drive unit 173 may mount on the shaft 173A, such that the master decoupling member 1761 rotates coaxially with the third drive unit 173. In other embodiments, the master decoupling member 1761 and the third drive unit 173 may mount on different shaft. The master decoupling member 1761 and the third drive unit 173 have different radius, the radius of the master decoupling member 1761 is $r_2$, the radius of the third drive unit 173 is $R_2$, wherein the $r_2 < R_2$, the master decoupling member 1761 drives the slave decoupling member to move by pulling or releasing the first decoupling cable 1767 or the second decoupling cable 1768. The master decoupling member 1761 and the third decoupling member 173 may receive same driving power, the driving power is the actuator in the slave operating device. In some embodiments, the master decoupling member and the third drive unit may mount on different shaft, but the master decoupling member and the third drive unit still may receive same driving power, for example, the actuator connects to the master decoupling member and, the third drive unit by different ways, driving the third drive unit and the master decoupling member by using the same one driving power can simplify control of the decoupling process, the decoupling mechanism does not need to detect the coupling state, the master decoupling member and the coupling source (the third drive unit) receive the same control information, but have different structure on the transmission side.

Referring to FIG. 8A, the first drive cable 151A and the second drive cable 151B are extending to the elongated shaft and connected to the end effector 150 through guidance of the first guide pulley 177A, the first guide portion 1763 and the third guide pulley 177C. The third drive cable 152A and the fourth drive cable 152B are extending to the elongated shall and connected to the end effector 150 through guidance of the second guide pulley 177B, the second guide portion 1764 and the fourth guide pulley 177D. The fifth drive cable 153A and the sixth drive cable 153B are extending to the elongated shaft and connected to the end effector 150 through guidance of the fifth guide pulley 177E and a sixth guide portion 177E Regarding to how the first drive cable 151A to the sixth drive cable 153B connected to the end effector 150 has been described in detail above, details are not described herein again.

Figure 8B:
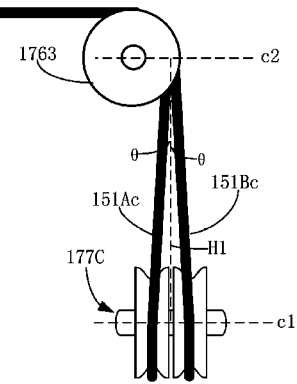
FIG. 8B and FIG. 8C are schematic partial views of a first drive cable and a second drive cable wrapped on the guide pulleys inside of the drive device shown in the FIG. 8A.
Figure 8C:
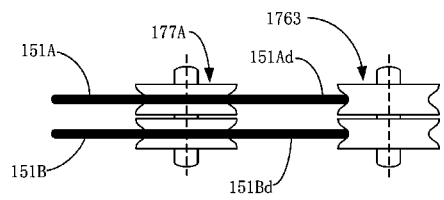
Figure 8D:
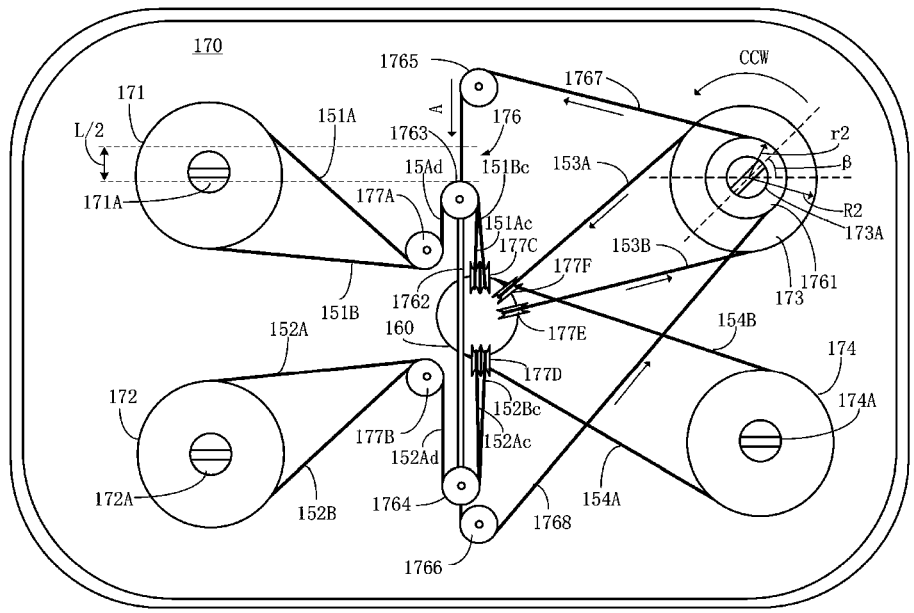
FIGS. 8D-8E are schematic views of decoupling process of the drive device shown in FIG. 8A.
Figure 8E:
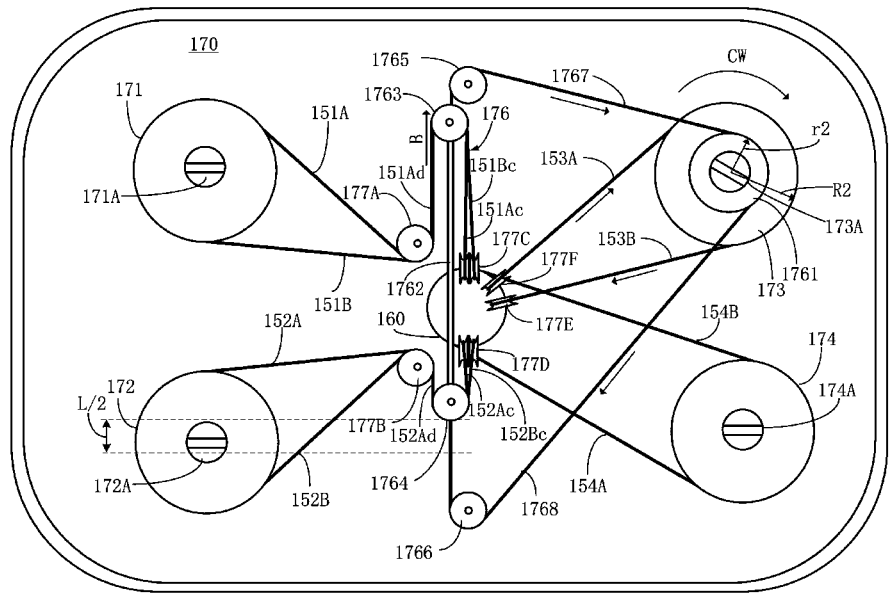

The decoupling process as shown in FIG. 8D, when the third drive unit 173 rotates counterclockwise (the first direction) with the shaft 173A, the third drive unit 173 pulls the sixth drive cable 153B and releases the fifth drive cable 153A, whereby the second support member 220 of the end effector 150 pivot around the axis A' of the second pin, the end effector 150 performs pitch motion. As described above, the wrapped angle length if the third drive cable 152A and the fourth drive cable 152B wrapped on the sixth pulley 216 and the seventh pulley 217 needs to be reduced L to effect the second support member 220 pivot around the axis AA' of the second pin 312, whereby the end effector 150 performs pitch motion. As described above, to effect pitch motion of the end effector 150, the wrapped angle length of the first drive cable 151A and the second drive cable 151B respectively wrapped on the fifth pulley 215 and the eighth pulley 218 needs to be increased L, at the same time, the wrapped angle length of the third drive cable 152A and the fourth drive cable 152B respectively wrapped on the sixth pulley 216 and the seventh pulley 217 needs to be reduced L. Because the master decoupling member 1761 coaxially rotates with the third drive unit 173, when the third drive unit 173 rotates with the driving shaft 173A counterclockwise, the master decoupling member 1761 rotates with the driving shaft 173A as well, the master decoupling member 1761 pulls the first decoupling cable 1767 and release the second decoupling cable 176B, if a circular arc which the master decoupling member 1761 has turned is $$\frac{L}{2},$$

a distance which the slave decoupling member 176 is moved that pulled by the first decoupling cable 1767 in a direction of A is $$\frac{L}{2},$$

the movement of the slave decoupling member 176 causes length of the first drive cable 151A and the second drive cable 151B inside of the drive device 170 reduce L, that is length of the first pair of cables reduce 2L, accordingly, the length of third drive cable 152A and the fourth drive cable 152B inside of the drive device 170 increase L, that is length of the second pair of cables inside of the drive device 170 increase 2L.

Length reduction amount of the first drive cable 151A and the second drive cable 151B inside of the drive device 170 is equal to the increase amount of wrapped angle length of the first drive cable 151A and the second drive cable 151B respectively wrapped on the fifth pulley 215 and the eighth pulley 218, length increase amount of the third drive cable 152A and the fourth drive cable 152B inside of the drive device 170 is equal to the reduction amount of the wrapped angle length of the third drive cable 152A and the fourth drive cable 152B respectively wrapped on the sixth pulley 216 and the seventh pulley 217. In contrary, as shown in 8E, when the third drive unit 173 and the master decoupling member 1761 rotate clockwise (second direction), length increase amount of the first drive cable 151A and the second drive cable 151 inside of the drive device 170 is equal to the reduction amount of wrapped angle length of the first drive cable 151A and the second drive cable 151B respectively wrapped on the fifth pulley 215 and the eighth pulley 218, length reduction amount of the third drive cable 152A and the fourth drive cable 152B inside of the drive device 170 is equal to the increase amount of the wrapped angle length of the third drive cable 152A and the fourth drive cable 152B respectively wrapped on the sixth pulley 216 and the seventh pulley 217. Such that the length change of first drive cable and the second drive cable inside of the drive device provides length change amount of the first drive cable and the second drive cable due to the pitch motion of the end effector, the movement of the third pair of cables is no longer constrained to the first pair of cables and the second drive cables, the decoupling mechanism effects decoupling the coupling relationship between the third pair of cables with the first pair of cables and the second pair of cables.

To effect the decoupling mechanism to precisely and controllably decouple the relationship between the first pair of cables, the second pair of cables and the third pair of cables, the master decoupling member 1761 drives the slave decoupling member 176 to move linearly all the time, the change of length of the first drive cable 151A, the second drive cable 151B, the third drive cable 152A and the fourth drive cable 152B is always linear. As shown in FIG. 8A, the first decoupling cable 1767 extends to the slave decoupling member 176 along the in the direction of motion of the slave decoupling member 176 and fixed to the an end of the slave decoupling member 176 via guidance of the seventh guide pulley 1765, similarly, the second decoupling cable 1768 extends to the slave decoupling member 176 along the in the direction of motion of the slave decoupling member 176 and fixed to the other end of the slave decoupling member 176 via guidance of the eighth guide pulley 1766, such that the movement of the master decoupling member 1761 causes the slave decoupling member to move linearly. A part of the first decoupling cable 1767 between the seventh guide pulley 1765 and the slave decoupling member 176 is parallel to a direction of the movement of the slave decoupling member 176, a part of the second decoupling cable 176B between the eighth guide pulley 1766 and the slave decoupling member 176 is parallel to a direction of the movement of the slave decoupling member 176. In the decoupling process, rate of length change of the first decoupling cable 1767 and the second decoupling cable 176B is directly proportional to linear velocity of rotation of the master decoupling 1761 member, therefore, moving speed of the slave decoupling member 176 is directly proportional to the linear velocity of rotation of the master decoupling 1761 member and the third drive unit 173, so as to the decoupling process is precise and controllable.

Referring to FIGS. 8B-8C, each of the first guide pulley 177A, the first guide portion 1763 and the third guide pulley 177C has two pulleys side by side, pulleys of the fixed guide pulley 177A, the first guide portion 1763 and the third guide pulley 177C are used for guidance of the first drive cable 151A and the second drive cable 151B, a first decoupling cable segment 151Ac of the first drive cable 151A is located between the third guide pulley 177C and the first guide portion 1763, a third decoupling cable segment 151Ad of the first drive cable 151A is located between the first guide portion 1763 and the first guide pulley 177A, a segment decoupling cable segment 151Bc of the second drive cable 151B is located between the third guide pulley 1770 and the first guide portion 1763, a fourth decoupling cable segment 151Bd of the second drive cable 151B is located between the first guide portion 1763 and the first guide pulley 177A, each of the second guide portion 1764, the second guide pulley 177C and the fourth guide pulley 177D has two pulleys side by side. Each of the third drive cable 152A and the fourth drive cable 152B respectively has a fifth decoupling cable segment 152Ac and a sixth decoupling cable segment 152Bc between fourth guide pulley 177D and the second guide portion 1764, has a seventh decoupling cable segment 152Ad and eighth decoupling cable segment located between the second guide portion 1764 and the third guide pulley 177B (the seventh decoupling cable segment 152Ad is not shown in FIG. 8A because of shield). For decoupling process becomes more precise, it is necessary that length change of the first decoupling cable portion 151Ac is equal to length change of the second decoupling cable segment 151Bc. Then an angle formed by the first decoupling cable segment 151Ac and a plane is θ, an angle formed by the second decoupling cable segment 151Bc and the plane is θ, the plane is perpendicular to the axis el of the third pulley 177C and passing through the center of the third guide pulley 177C, the fifth decoupling cable segment 152Ac and the seventh decoupling cable segment 152Bc have similar setting on the seventh guide pulley 177D, therefore, length change amount of the first decoupling cable portion 151Ac and the second decoupling cable segment 151Bc is same during the decoupling process. In addition, since the angle θ is small, the first decoupling cable segment 151Ac and the second decoupling cable segment 151Bc are substantially equal to a distance H1, the distance H1 is a distance between pivot axis of the first guide pulley 1764 and pivot axis of the fourth guide pulley 177B. The first decoupling cable segment 151Ac and the second decoupling cable segment 151Bc are substantially parallel to the movement direction of the slave decoupling member 176 during the decoupling process, such that it is slight that the nonlinear change of the first decoupling cable segment 151Ac and the second decoupling cable segment 151Bc due to the first decoupling cable segment 151Ac and the second decoupling cable segment 151Bc during the decoupling process, whereby more precise decoupling is effected.

Referring to FIG. SC, the third decoupling cable segment 151Ad, the fourth decoupling cable segment 151Bd, the seventh decoupling cable segment 152d and eighth decoupling cable segment are substantially parallel to the movement direction of the slave decoupling member 176, whereby rate of length change of the third decoupling cable segment 151Ad, the fourth decoupling cable segment 151Bd, the seventh decoupling cable segment 152Ad and the eighth decoupling cable segment due to the movement of the slave decoupling member 176 is directly proportional to speed of movement of the slave decoupling member 176. As described above, the speed of movement of slave decoupling member 176 is directly proportional to linear velocity of rotation of the master decoupling member 1761 and the third drive unit 173. Rate of length change of each of the first drive cable 151A, the second drive cable 151B, the third drive cable 152A, the fourth drive cable 1528 is directly proportional to linear velocity of third drive unit 173, the master decoupling, member 173 and third drive unit 173 precisely control the length change amount of the first pair of cables and the second pair of cables on the end effector 150, to effect precise and controllable decoupling.

An embodiment of decoupling process as shown in FIG. 8D, compared with the stated shown in FIG. SA, the master decoupling member 1761 has turned a $$\frac{L}{2}$$

circular arc counterclockwise, the slave decoupling member 176 moves a $$\frac{L}{2}$$

distance in a direction at A accordingly, length of the fast decoupling cable segment 151Ac, the second decoupling cable segment 151Bc, the third decoupling cable segment 151Ad, the fourth decoupling cable segment 151Bd reduced $$\frac{L}{2}$$

simultaneously, such that the first drive cable 151A and the second drive cable 151B reduced length of L inside of the drive device 170, that the first pair of cables reduced length 2L inside of the drive device. Similarly, length of the fifth decoupling cable segment 152Ac, the sixth decoupling cable segment 152Ac, the seventh decoupling cable segment 152Bc and the eighth decoupling cable segment 151Bd increased $$\frac{L}{2}$$

simultaneously, that is length the second pair of cables increased 2L inside of the drive device.

Referring to FIG. 7A, in an embodiment, radius of the second pulley group is radius of ring groove 319 is $R_1$, the ring groove is located on a pitch wheel 319 of the second support member 220 and used for receiving and guiding the fifth drive cable and the sixth drive cable, when end effector 150 performs pitch motion, the fifth drive cable 153A or the sixth drive cable 153B forms wrapped angle in a ring groove 319A of the pitch. During process, of the end effector 150 rotating from a state shown in FIG. 5D to a state shown in FIG. 7A, when a pitch angle of the end effector 150 is a wrapped angle length of the fifth drive cable 153A wrapped on the ring groove 319A increased L1, a wrapped angle length of the sixth drive cable 153B wrapped on the annular groove 319A decreased L1, where L1=α*R1, since the pitch motion of end effector 150 is driven by the third drive unit 173 in the drive device 170, as shown in FIG. SD, at this time, if the angle of pitch motion of the end effector 150 is α, the angle β needs to be rotated counterclockwise (the first direction) by the third drive unit 173, the third drive unit 173 releases the fifth drive cable 153A and simultaneously pulls the sixth drive cable 153B, so that the length of the fifth drive cable 153A wound around the third drive unit 173 is reduced by L1. The length of the sixth drive cable 153B wound around the third drive unit 173 is increased by L1, where L1=β*R2. Since the master decoupling member 1761 and the third drive unit 173 rotate coaxially, at this time, the master decoupling member 1761 releases the first decoupling cable 1767 and simultaneously pulls the second decoupling cable 1768, so that the length of the first decoupling, cable 1767 wound around the master decoupling member 1761 is reduced by L/2, that is, the first decoupling cable 1767 is released L/2, and the length of the second decoupling cable 1768 wound around the master decoupling member 1761 is increased by L/2, where L/2=β*r2, so that the sliding frame 1762 moves the distance L/2 along the A direction. The lengths of the first drive cable 151A and the second drive cable 151B in the drive device 170 are reduced by L, respectively, and, the lengths of the third drive cable 152A and the fourth drive cable 152B in the drive device 170 are increased by L, respectively. It can be seen that L=α*r1. To sum up, through the described above four formulas: L1=α*R1, L1=β*R2, L/2=β*r2, L=α*r1 can be obtained the following relationship:

$$\frac{R2}{r2} = 2\frac{R1}{r1}$$

The aforementioned relationship shows that the ratio of the radius of the third drive unit 173 to the radius of the master decoupling member 1761 is twice the ratio of the radius of the groove bottom of the annular groove 319A of the pitch wheel 319 to the radius of the second pulley group, the 2-fold relationship is caused by the fact that the slave decoupling member 176 has two guide portions, that is, the first guide portion 1763 and the second guide portion 1764. In other embodiments, the number of guide portions of the slave decoupling member 176 may also be other numbers, so that the relation between the ratio of the radius of the third drive unit to the radius of the master decoupling member and the ratio of the radius of the pitch wheel to the radius of the second pulley group also changes with it. For example, the slave decoupling member may have N guide portions, and the ratio of the radius of the third drive unit to the radius of the master decoupling member is N times the ratio of the radius of the groove bottom of the annular groove of the pitch wheel, to the radius of the second pulley group, so that, $$\frac{R2}{r2} = N\frac{R1}{r1}.$$

However, the increase in the number of guide portions of the slave decoupling member corresponds to the increase in the volume of the slave decoupling member, and it is used two guide portions of the decoupling member in the above-mentioned embodiment. It can be understood that, the radius of the above-mentioned drive edit and the radius of the master decoupling member both refer to the radius of the part on which the drive cable or the decoupling cable is wound, such as the radius of the winch, and the radius of the pulley refers to the radius of the groove bottom of the pulley, in this way, the wrap angle length of the drive cable around the pulley can be calculated. Although the radius of the pulley has different interpretations in different documents (such as the radius of the groove, the radius of the groove bottom), the radius of the pulley in the disclosure is a parameter used to measure the wrapped angle length of the drive cable around the pulley.

Therefore, the length changes of the first pair of cables and the second pair of cables on the side of the end effector 150 required by, the pitching motion of the end effector 150 are all accurately provided by the length variation of the first pair of cables and the second pair of cables within the drive device 170 caused by the slave decoupling member 176, so that the movement of the third pair of cables is no longer restricted by the first pair of cables and the second pair of cables, so as to achieve precise decoupling between the third pair of cables and the first and second pair of cables. During the whole decoupling process, the lengths of the first part cable 151Aa, the second part cable 151Ba, the third part cable 152Aa and the fourth part cable 153Ba can be kept constant, and the tension of the entire first pair of cables and the entire second pair of cables remained unchanged from beginning to end, and due to the whole decoupling process, only the axis 173A of the third drive unit 173 moves, the first drive unit 171 and the second drive unit. 172 are completely independent from the third drive unit 173. In addition, since the master decoupling member 1761 and the coupling source that causes the coupling relationship, that is, the third drive 173, rotate coaxially, the master decoupling member 1761 rotates with the same angular velocity as the third drive unit 173, and they are physically move in complete synchronization, and do not need the main operation setting to give the signal to control the decoupling mechanism, the motion of the decoupling mechanism runs synchronously with the motion of the coupling source, the decoupling mechanism synchronizes the third drive unit for decoupling without any delay, and the length variation of the first pair of cables and the second pair of cables on the end effector 150-side caused by the couplings source third drive unit 173 can be completely and accurately mapped to the length variation of the first pair of cables and the second pair of cables on the slave decoupling member 176. Therefore, the slave decoupling member 176 can completely and accurately remove the coupling relationship between the third pair of cables, the first pair of cables, and the second pair of cables. The so-called precise decoupling refers to how much the third drive unit rotates degree, how much distance will be moved from the slave decoupling member 176, the relationship between the two is definite, and the above-mentioned proportions equation of each radius have been given. In addition, since the slave decoupling member 176 is always driven by the master decoupling member 1761 to move to the corresponding position, rather than being driven by the first pair of cables or the second pair of cables, the first pair of cables and the second pair of cables are substantially unstressed from the slave decoupling member 176 during the entire decoupling process, so that the tension of the first pair of cables and the second pair of cables daring the decoupling process is substantially unchanged. The service life of the first pair of cables and the second pair of cables is increased and the precision of the end effector 150 control is increased.

Figure 9A:
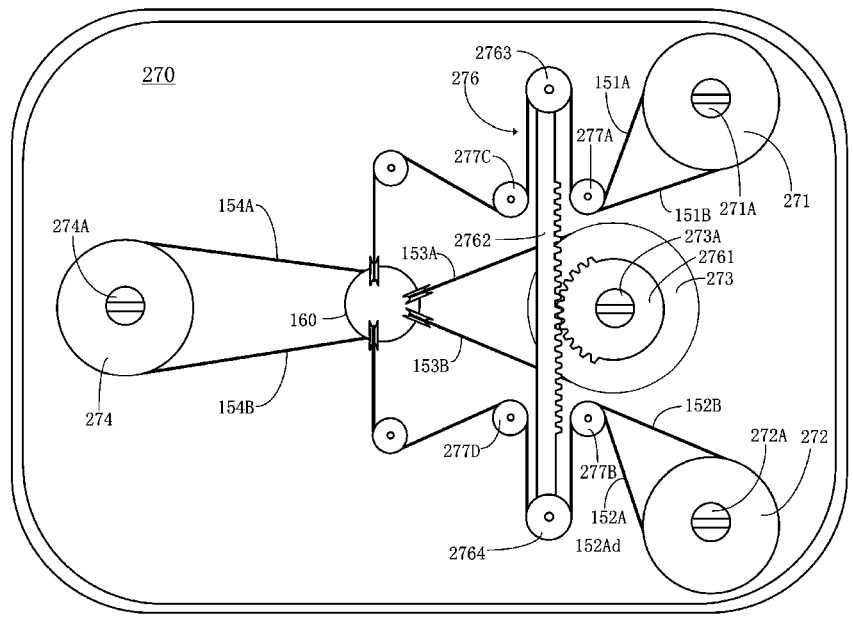
FIG. 9A is a schematic view of a drive device according to an embodiment of the present disclosure.
Figure 10A:
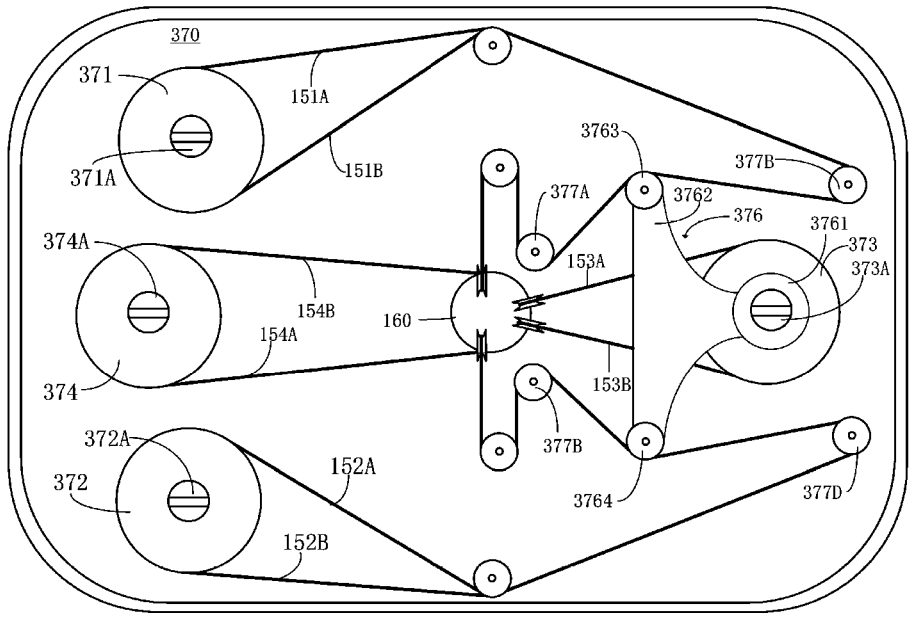
FIG. 10A is a schematic view of a drive device according to an embodiment of the present disclosure.
Figure 10B:
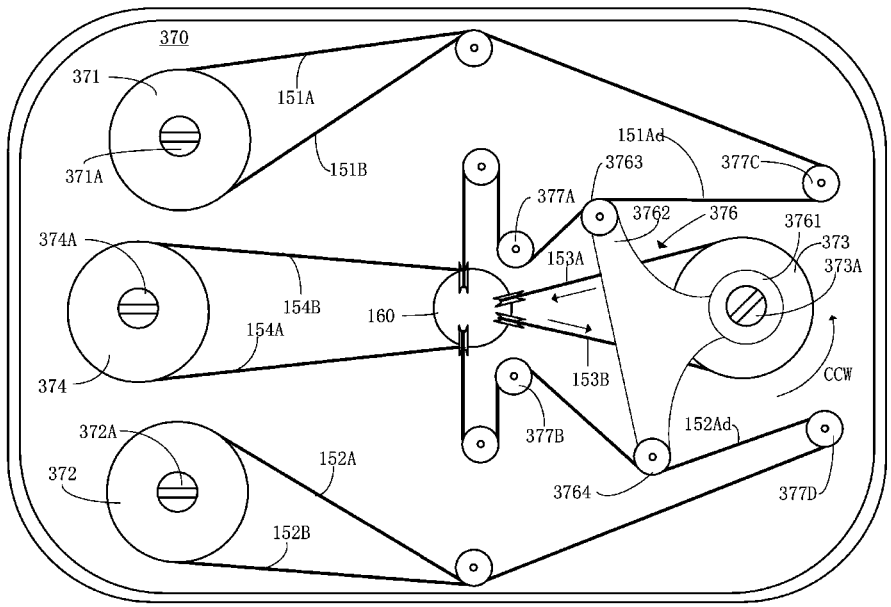
FIG. 10B is a schematic view of decoupling process of the drive device shown in FIG. 10A.

FIGS. 9A and 10B show a drive device 270 according to another embodiment of the present disclosure. The drive device 270B includes a first drive unit 271, a second drive unit 272, a third drive unit 273, a third drive unit 274, and a decoupling mechanism 276, when the first drive unit 271 rotates with its shaft 271A, the first drive unit 271 pulls or releases the first drive cable 151A or the second drive cable 151B so that the first jaw 230 rotates around the third pin 313. When the actuator in the instrument mounting bracket 132 drives the second drive unit 272 to rotate with its shaft 272A, the second drive unit 272 pulls or releases the third drive cable 152A or the fourth drive cable 152B so that the second jaw 240 rotating around the third pin 313, the first jaw 230 and the second jaw 240 rotate around the third pin 313 so that the end effector 150 performs opening and closing and/or yaw motion. When the actuator in the instrument mounting bracket 132 drives the third drive unit 273 to rotate with its shaft 273A, the third drive unit 273 pulls or releases the fifth driving cable 153A or the sixth driving cable 153B to cause the second bracket 220 to rotate around the axis AA' of the second pin, thereby implementing the pitching motion of the end effector 150.

The decoupling mechanism 276 includes a master decoupling member 2761 and a slave decoupling member, the master decoupling member 2761 is a gear coaxially rotating with the third drive unit 273, the slave decoupling member includes a rack 2762 and a first guide portion 2763 and a second guide portion 2764 connected at both ends of the tack 2762, the first drive cable 151A and the second drive cable 151B enter into the elongate shaft 160 after passing from the first guide portion 2763 of the slave decoupling member, and the third drive cable 152A and the fourth drive cable 1528 enter into the elongate shaft 160 after passing from the second guide portion 2764 of the slave decoupling member.

Figure 9B:
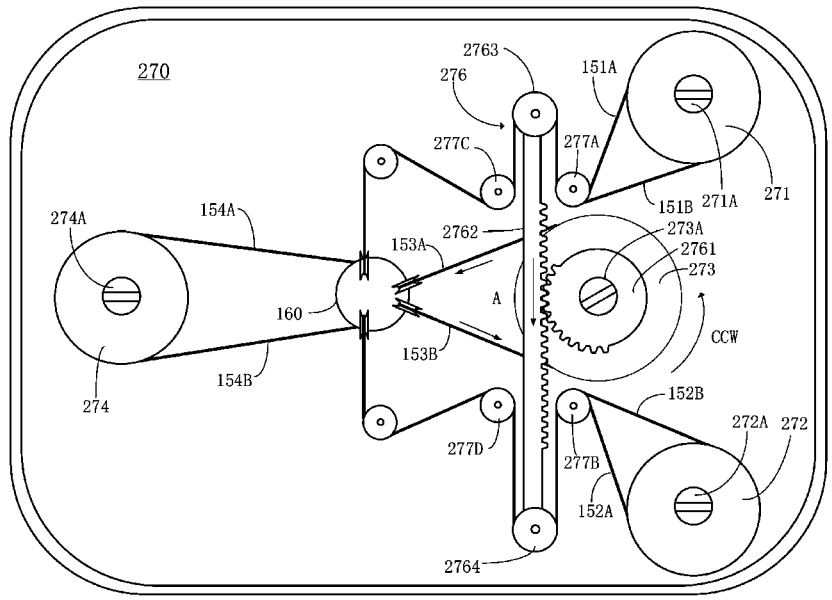
FIG. 9B is a schematic view of decoupling process of the drive device shown in FIG. 9A.

As shown in FIG. 9B, when the third drive unit 273 and the master decoupling member 273 rotate counterclockwise along with the shaft 273A, the third drive unit 273 pulls the sixth drive cable 153B to simultaneously release the fifth drive cable 153A, and the end effector. 150 performs a pitching motion as shown in FIGS. 7A and 7B. At the same time, if the master decoupling member 2761 rotates counterclockwise with an arc length of L/2, the length of movement from the slave decoupling member along the direction A driven by the master decoupling member 2761 is also L/2, the lengths of the last drive cable 151A and the second drive cable 151B between the first guide portion 2763 and the first guide wheel 277A and between the first guide portion 2763 and the third guide wheel 277C are reduced by L/2 at the same time. The lengths of the third drive cable 152A and the fourth drive cable 152B between the second guide portion 2764 and the second guide wheel 2778 and between the second guide portion 2764 and the fourth guide wheel 277D are increased by L/2 at the same time. So that the overall length of the first drive cable 151A and the second drive cable 151B within the drive device 270 is reduced by L, and the overall length of the third drive cable 152A and the fourth drive cable 1528 within the drive, device 270 is increased by L. Therefore, the decoupling mechanism 276 in the drive device 270 provides a length variation of the drive cable 151A-152B on the end effector 150-side required by the pitching motion of the end effector 150, thereby relieving the coupling relationship between the third pair of cables and the first pair of cables and the second pair of cables, and the movement of the third pair of cables is no longer restricted by the first pair of cables and/or the second pair of cables.

Figure 11A:
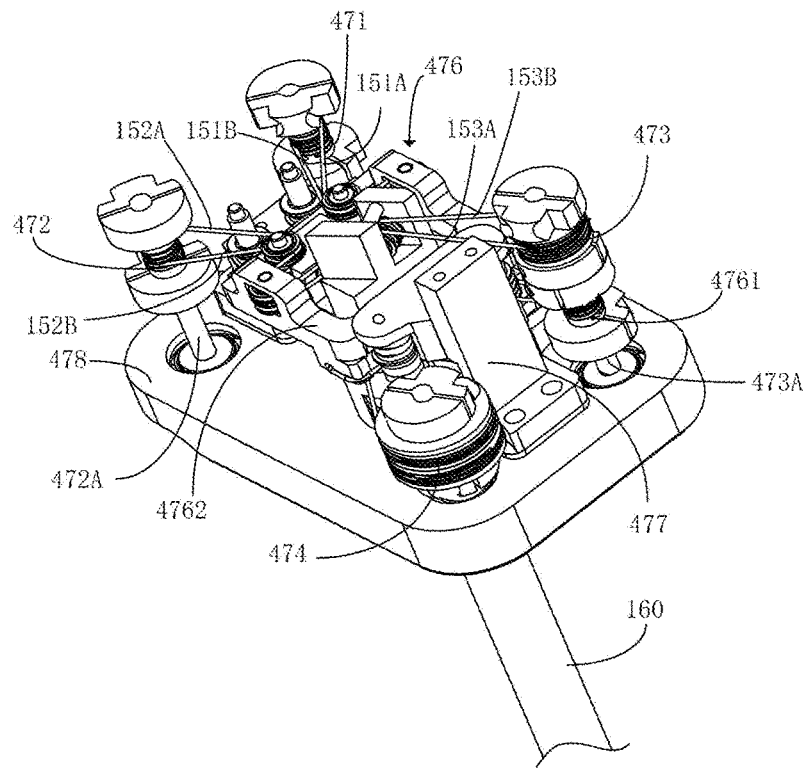
FIG. 11A is a perspective view of a drive device according to an embodiment of the present disclosure.
Figure 11B:
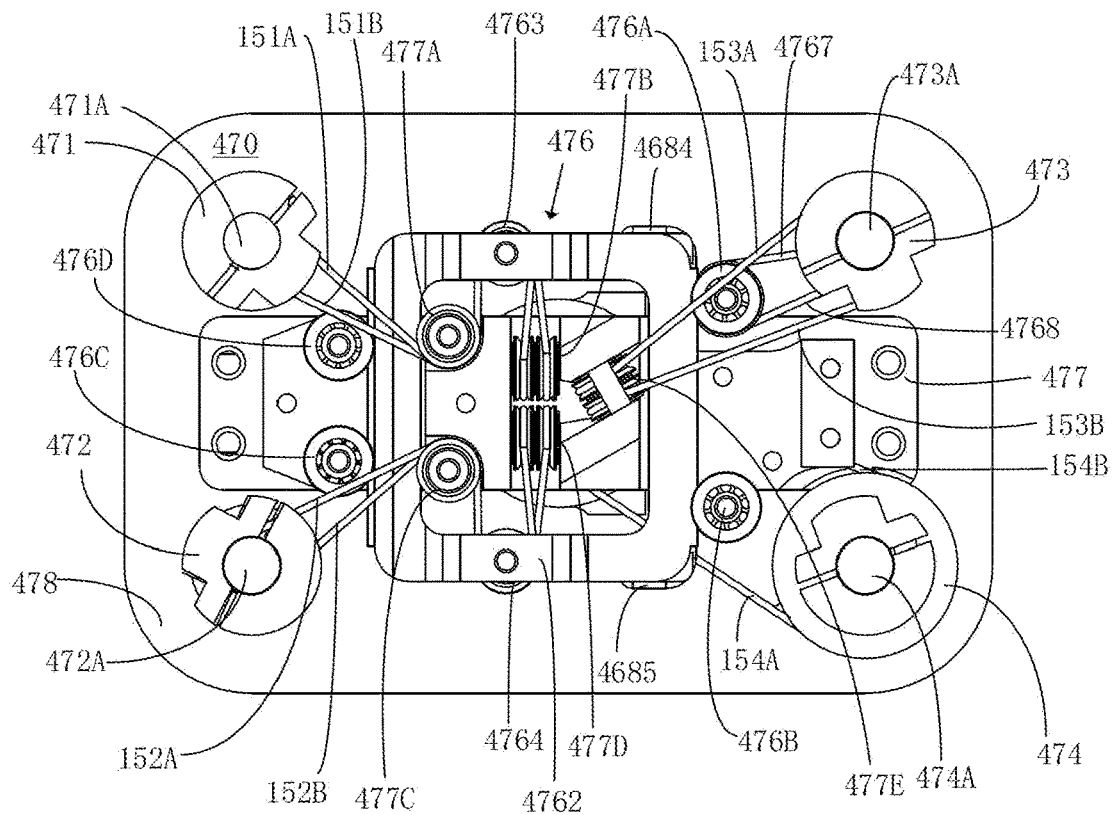
FIG. 11B is a plan view of the drive device shown in the FIG. 11A.

FIGS. 10A and 11B show a drive device 370 according to another embodiment of the present disclosure, the drive device 2708 includes a first drive unit 371, a second drive unit 372, a third drive unit 373, a fourth drive unit 374, and a decoupling, mechanism 376, except that the decoupling mechanism 376 structure is different from the two above-mentioned embodiments, the other components are substantially the same as those of the two embodiments, and details are not described herein again. The decoupling mechanism 376 includes a master decoupling member 3761 coaxially rotating with the third drive unit 373, a decoupling cam 3762 fixedly connected or integrally formed with the master decoupling member 3761, two ends of the decoupling cam 3762 are respectively connected by the first guide portion 3763 and the second guide portion 3764.

Figure 7C:
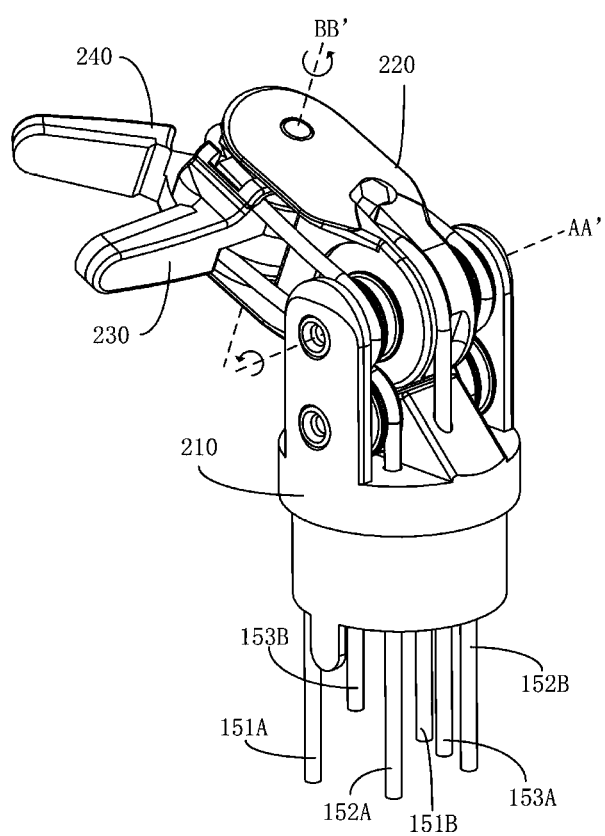
FIG. 7C is a pitch-yaw-clamp state of the end effector according to the embodiment shown in FIG. 5A.

As shown in FIG. 10B, when the master decoupling member 3761 and the third drive unit 373 rotate counter-clockwise together with the shaft 373A, the third drive unit 373 pulls the sixth drive cable 1538 and simultaneously releases the fifth drive cable 153A, and the end effector 150 performs a pitching motion as shown in FIG. 7A-7C, at the same time, the decoupling cam 3762 also rotates counter-clockwise with the shaft 373A driven by the master decoupling member 3761, thereby causing the lengths of the first drive cable 151A and the second drive cable 151B between the first guide pulley 377A and the third guide pulley 377C are reduced by L, while the lengths of the third drive cable 152A and the fourth drive cable 1528 between the second guide wheel 3778 and the fourth guide wheel 377D are increased by L at the same time. So that the decoupling mechanism 376 in the drive device 370 may provide a length variation of the drive cable 151A-1528 on the end effector 150-side required by the pitching motion of the end effector 150, therefore, the coupling relationship between the third pair of cables and the first pair of cables and the second pair of cables is eliminated, and the movement of the third pair of cables is no longer restricted by the first pair of cables and/or the second pair of cables.

FIGS. 11A-11F show a drive device according to another embodiment of the present disclosure, the drive device 470 includes a body 478, the body 478 is provided with a first drive unit 471, a second drive unit 472, a third drive titan 473And fourth drive unit 474, the elongate shaft 160 is connected to the body 478 through a bearing, the decoupling mechanism 476 includes a master decoupling member 4761 and a slave decoupling member 4762, the master decoupling member 4761 and the third drive unit 473Are both connected to the shaft 476A, the master decoupling member 4761 and the third drive unit 473 rotate coaxially with the shaft 473A, and the master decoupling member 4761 is arranged at a lower part of the third drive unit 473, that is, the master decoupling member 4761 is closer to the distal end of the drive device than the third drive unit 473. The slave decoupling member 4762 includes a sliding frame 4765 and a first guide portion 4763 and a second guide portion 4764 disposed at two ends of the sliding frame 4765, the sliding frame 4765 is slidably connected to the mounting base 477, the mounting base 477 is fixedly mounted on the body 478, and the mounting base 477 is provided with a first guide wheel 476A, a second guide wheel 476B, a third guide wheel 476C, and a fourth guide wheel 476D that cooperate with the sliding frame 4765, a first guide wheel 476A, a second guide wheel 476B, the third guide wheel 476C and the fourth guide wheel 476D form a sliding area for the sliding frame 4765 to slide therein, so that the sliding frame 4765 can be limited to slide within the sliding area on the mounting base 477.

The first drive cable 151A and the second drive cable 151B are wound on the first drive unit 471 in an opposite winding manner, the first drive cable 151A and the second drive cable 151B enter into the elongate shaft 160 after being guided successively by the first guide wheel 477A disposed on the mounting base 477, the first guide portion 4763 arranged on the sliding frame 4765 and the third amide wheel 477C disposed on the mounting base 477, and extend along the distal end of the elongate shaft 160 and are finally fixed to the first jaw 230 on the end effector 150. The third drive cable 152A and the fourth drive cable 152B are wound on the second drive unit 472 in an opposite winding manner, the third drive cable 152A and the fourth drive cable 152B enter into the elongate shaft 160 after being, guided successively by the second guide wheel 477B disposed on the mounting base 477, the second guide portion 4764 arranged on the sliding frame 4765 and the fourth guide wheel 477D disposed on the counting base 477, and extend along the distal end of the elongate shaft 160 and are finally fixed to the second jaw 240 on the end effector 150. The fifth drive cable 153A and, the sixth drive cable 153B enter into the elongate shaft 160 after being guided by the fifth guide wheel 477E, and extend along the distal end of the elongate shaft 160 and are finally fixed to the second support member 220. The other end of the seventh drive cable 154A and the eighth drive cable 154B wound on the fourth drive unit 474 is wound around the proximal end of the elongate shaft 160, and the same as in above mentioned embodiments, the third pair of cables and the first pair of cables, the second pair of cables also having a coupling relationship on the end effector side.

The mounting base 477 includes a first boss 4771, the mounting base 477 is fixed to the body 478 through the first boss 4771, the first boss 4771 is provided with a second boss 4772, the third boss 4773 and the fourth boss 4774. The second boss 4772 is provided with a first mounting hole 4791 and a second mounting hole 4792, and the second guide wheel 476B and the third guide wheel 476C are respectively mounted on the second boss 4772 through the second mounting hole 4792 and the first mounting hole 4791. The third boss 4773 is provided with a third mounting hole 4793 and a fourth mounting hole 4794 the first guide wheel 477A and the second guide wheel 4778 are respectively mounted to the third boss 477B through the third mounting hole 4793 and the fourth mounting hole 4794. The fourth boss 4774 is provided with a fifth mounting hole 4795, the first guide wheel 476A and the sixth guide wheel 4769 located below the first guide wheel 476A are installed into the fifth mounting, hole 4795 through the same shall, and the sixth guide wheel. 4769 is configured to guide the first decoupling cable 4767 and the second decoupling cable 4768. The fifth boss 4775 has a seventh mounting hole 4799, and the fourth guide wheel 4761 is mounted to the fifth boss 4775 through the seventh mounting hole 4799. In order to keep the first guide wheel 476A and the fourth guide wheel 476D at the same height after being mounted on the mounting base 477, and the fourth boss 4774 and the fifth boss 4775 have a certain height difference, which is approximately equal to the height of the sixth guide wheel 4769.

The mounting base 477 is further provided with a first mounting post 4776 and a second mounting post 4777, the first mounting post 4776 and the second mounting post 4777Are arranged in parallel oblique direction, the first mounting post 4776 and the second mounting post 4777Are provided with a sixth mounting hole 4796 and a seventh mounting hole 4797, and the fifth guide wheel 477E is mounted on the first mounting post 4776 and the second mounting post 4777 through the sixth mounting hole 4796. The limiting pin 477F, which is used to prevent the fifth drive cable 153A and the sixth drive cable 153B from escaping from the fifth guide wheel 477E, is mounted on the first mounting post 4776 and the second mounting post 4777 through the seventh mounting hole 4797. The first mounting post 4776 and the second mounting post 4777Are arranged in parallel oblique direction such that the fifth guiding wheel 477E can guide the drive cable coming from the oblique direction.

A mounting groove 4798 and a wire passing hole 4778 are provided between the first mounting post 4776 and the second mounting post 4777 and the third boss 4773, the third guiding wheel 477C and the fourth guiding wheel 477D are mounted on the mounting base 477 through the mourning groove 4798, the wire passing hole 4778 is located between the third guide wheel 47C and the fourth guide wheel 477D mounted on the mounting base 477 in the mounting groove 4796, and the wire passing hole 4778 communicates with the elongate shaft 160 for guiding the drive cable into the elongate shaft 160.

Figure 11C:
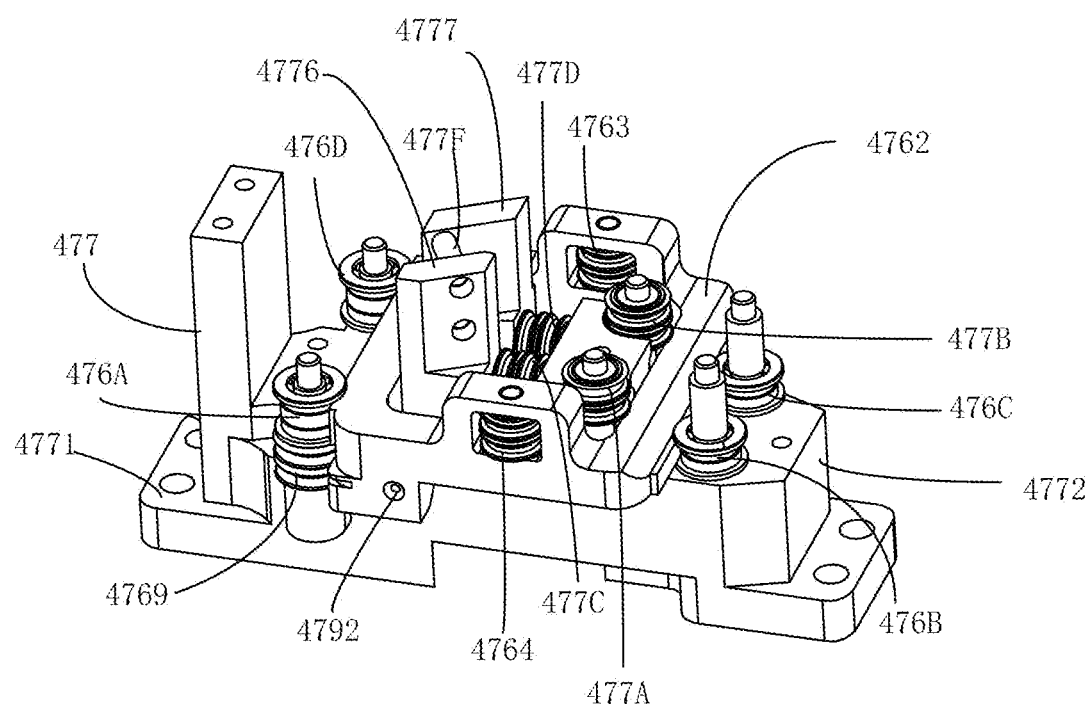
FIG. 11C is a perspective view of a slave decoupling member and a base of the drive device shown in FIG. 11A.
Figure 11D:
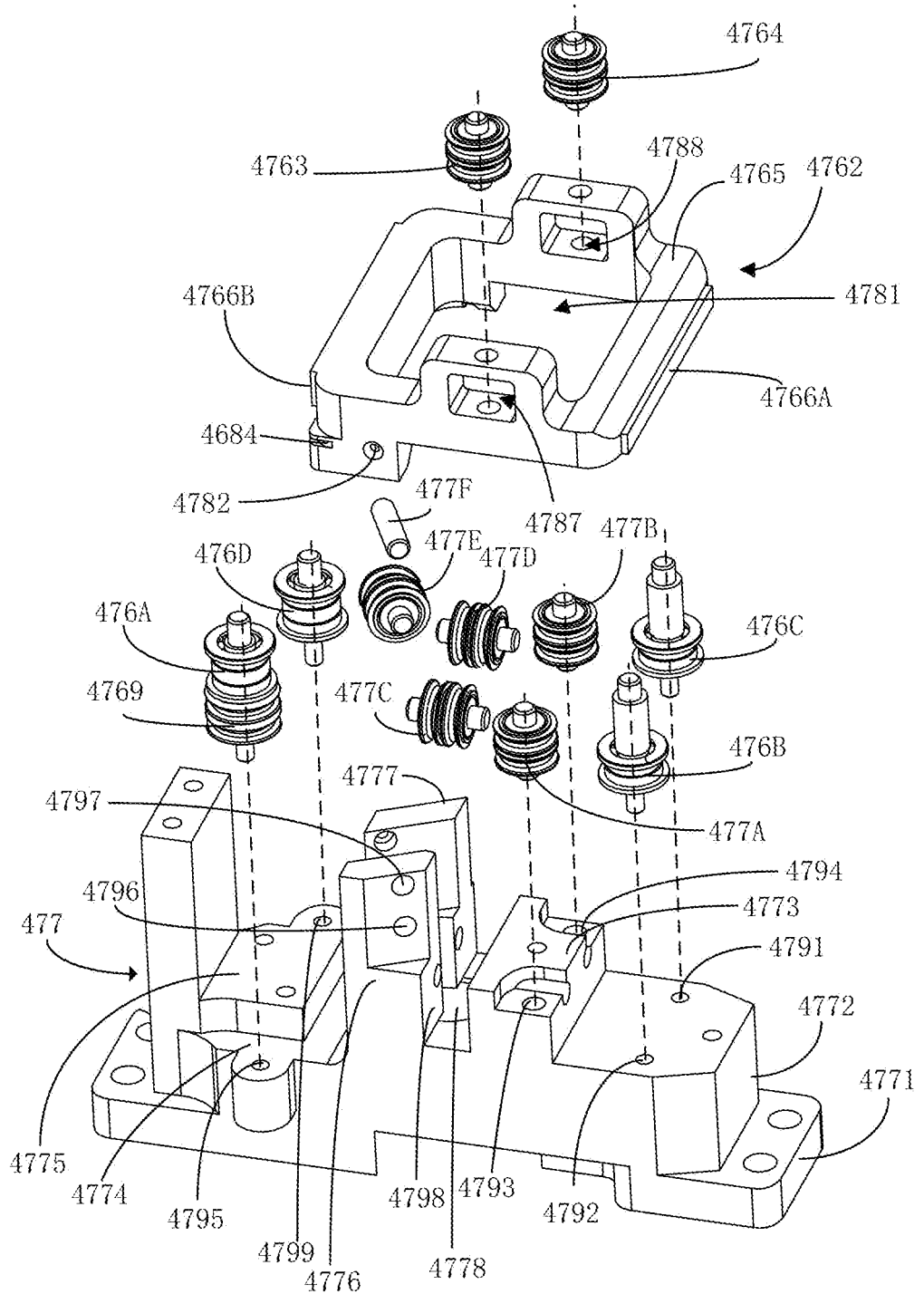
FIG. 11D is an exploded view of the slave decoupling member and the base shown in the FIG. 11C.
Figure 11E:
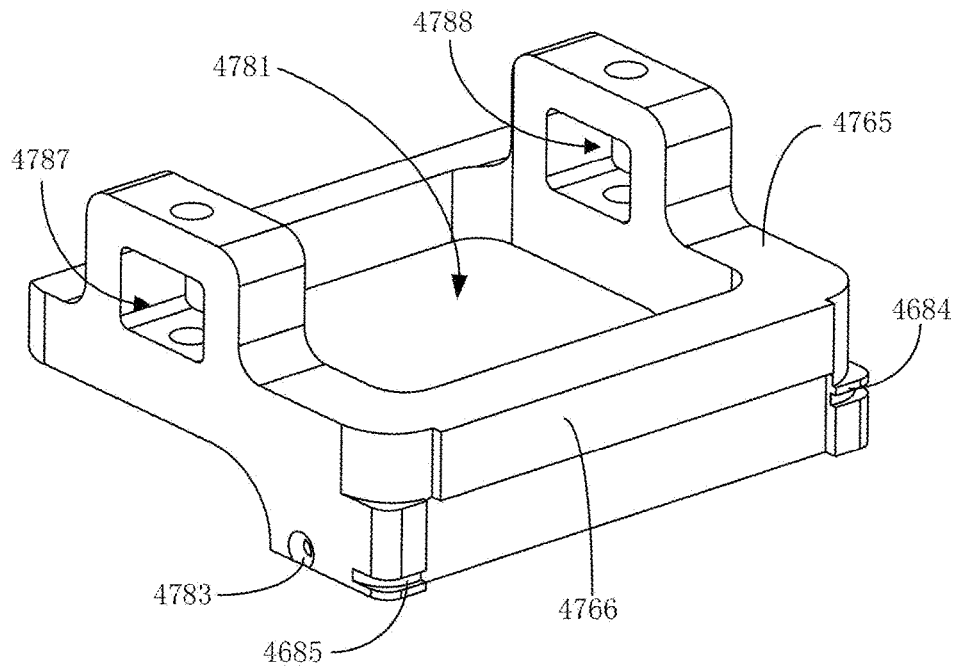
FIG. 11E is a perspective view of a sliding frame of the drive device shown in FIG. 11A.

As shown in FIGS. 11C and 11E, a first slide rail 4766A and a second slide rail 47668 are provided on both sides of the sliding frame 4765 of the slave decoupling member 4762, and after the sliding frame 4765 is connected to the mounting base 477, the first sliding rail 4766A and the second sliding rail 4766B can slide in the sliding area formed by the first guide wheel 476A, the second guide wheel 476B, the third guide wheel 476C, and the fourth guide wheel 476D. The first slide rail 4766A is slidably disposed on the second guide wheel 476B and the third guide wheel 476C, and the second guide wheel 4768 is aligned with the third guide wheel 4760. The second slide rail 47668 is slidably disposed on the first guide wheel 476A and the fourth guide wheel 476D, and the first guide wheel 476A is aligned with the fourth guide wheel 476D. Two ends of the sliding frame 4765 are respectively provided with a first mounting space 4787 and a second mounting space 4788, and the first guide portion 4763 and the second guide portion 4764 are respectively mounted in the first mounting space 4787 and the second mounting space 4788. The sliding frame 4765 also has a central opening 4781 for receiving the first mounting post 4776, the second mounting post 4777, and the third boss 4773 and cooperating with the first mounting post 4776 the second mounting post 4777, and the third boss 4773 to limit the sliding travel of the sliding frame 4765 within the sliding area on the mounting base 477.

One end of the sliding frame 4765 has a first guide groove 4684 and a first fixing hole 4782, and the other end has a second guide groove 4685 and a second fixing hole 4783, the first guide groove 4684 is used for guiding the first decoupling cable 4767 to be fixed into the first fixing hole 4782, and the second guide groove 4685 is used for guiding the second decoupling cable 4768 to be fixed into the second fixing hole 4783. The first guide groove 4684 and the second guide groove 4685 are staggered with each other in the height direction of the sliding frame 4765, so that the first decoupling cable 4767 and the second decoupling cable 4768 can be fixed to the sliding frame 4765 without interfering with each other.

Figure 11F:
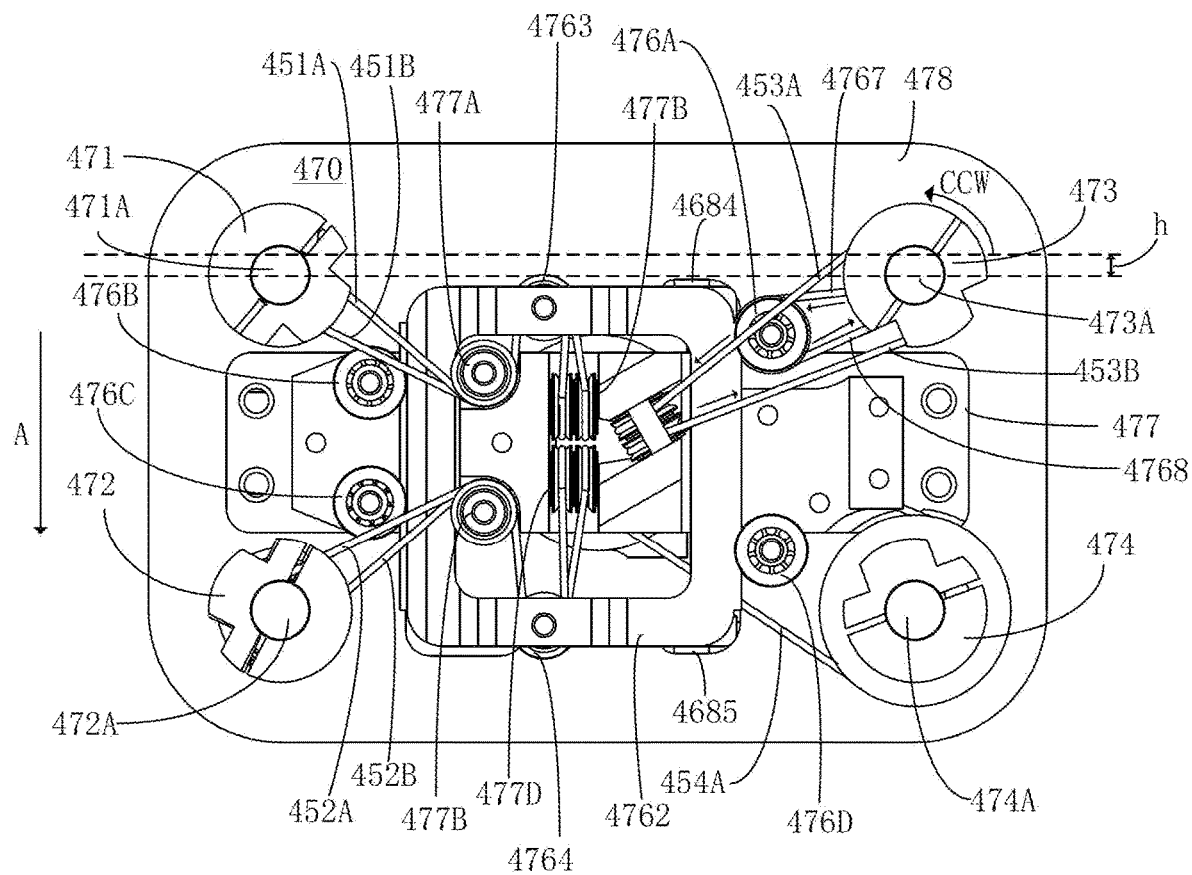
FIG. 11F is a schematic view of decoupling process of the drive device shown in FIG. 11A.

The decoupling process of this embodiment is shown in FIG. 11F, when the third drive unit 473 rotates counterclockwise (the first direction) along with the shaft 473A driven by the actuator, since the master decoupling member 4761 and the third drive unit 473 are connected to the actuator through the same shaft 473A, at this time, the master decoupling member 4761 and the third drive unit 473 rotate counterclockwise along with the shaft 473A at the same angular velocity, the third drive unit 473 pulls the sixth drive cable 153B and simultaneously releases the fifth drive cable 153A, so that the end effector 150 performs the pitching motion as shown in FIGS. 7A and 7B. At this time, the master decoupling member 4761 pulls the second decoupling cable 4768 and releases the first decoupling cable 4767 at the same time, so that the slave decoupling member 4762 moves along the A direction shown in FIG. 11F, If the slave decoupling member 4762 in FIG. 11F moves a distance L/2 along the A direction relative to the zero state of the slave decoupling member 4762 in FIG. 108, then the length of the first drive cable 151A and the second drive cable 151B between the first guide portion 4763 and the first guide wheel 477A, and the length between the first guide portion 4763 and the third guide wheel 477C are simultaneously reduced by L/2, therefore, the length of the first drive cable 151A and the length of the second drive cable 151B in the drive device 470 are reduced by L, and the length of first pair of cables in the drive device is reduced by 2L. Correspondingly, the length between the second guide portion 4764 and the second guide wheel 4778 of the third, drive cable 152A and the fourth drive cable 152B, and the length between the second guide portion 4764 and the fourth guide wheel 477D are increased simultaneously by L/2, so that the length of the third driving cable 152A and the fourth driving cable 152B in the drive device are respectively increased by L, and the length of the second pair of cables in the drive device is increased by 2L. Thus, a length variation of the drive cable 151A-152B on the end effector 150-side required by the pitching motion of the end effector 150, thereby relieving the coupling relationship between the third pair of cables and the first pair of cables and the second pair of cables, and the movement of the third pair of cables is no longer restricted by the first pair of cables and the second pair of cables, so that the end effector 150 can smoothly perform the pitching operation.

When the third drive unit 473 and the master decoupling member 4761 rotate in a second direction (clockwise) opposite to the first direction, the length of the first drive cable 151A and the length of the second drive cable 151B in the drive device 470 are increased by L, the length of the third drive cable 152A and the length of the fourth drive cable 152B in the drive device are reduced by L and the specific process is just opposite to the above-mentioned rotation in the first direction and will not be repeated here.

FIGS. 12A-13E are a drive device 570 according to an embodiment of the present disclosure, the drive device 570 is provided with a first drive device 570 including a body 578, and a first drive unit 571, a second drive unit 572, a third drive unit 573 and a fourth drive unit 574 disposed on the body 778, the proximal ends of the first drive cable 151A and the second drive cable 151B are wound around the first drive unit 571 in an opposite manner, the proximal ends of the third drive cable 152A and the fourth drive cable 152B are wound around the second drive unit 572 in an opposite manner. The proximal ends of the fifth drive cable 153A and the sixth drive cable 153B are wound around the third drive unit 573 in an opposite manner.

Figure 12A:
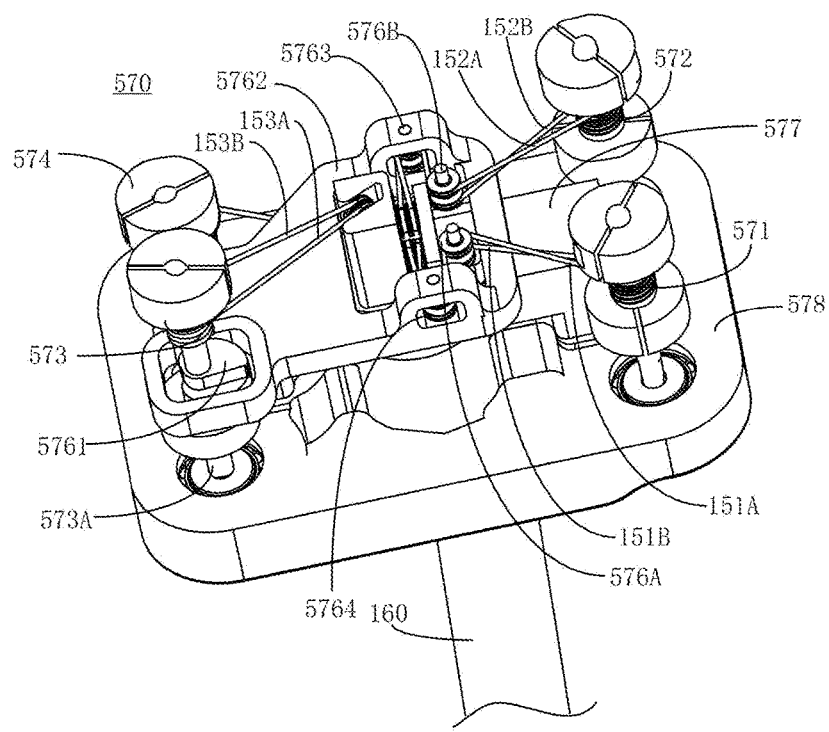
FIG. 12A is a perspective view of a drive device according to an embodiment of the present disclosure.
Figure 12B:
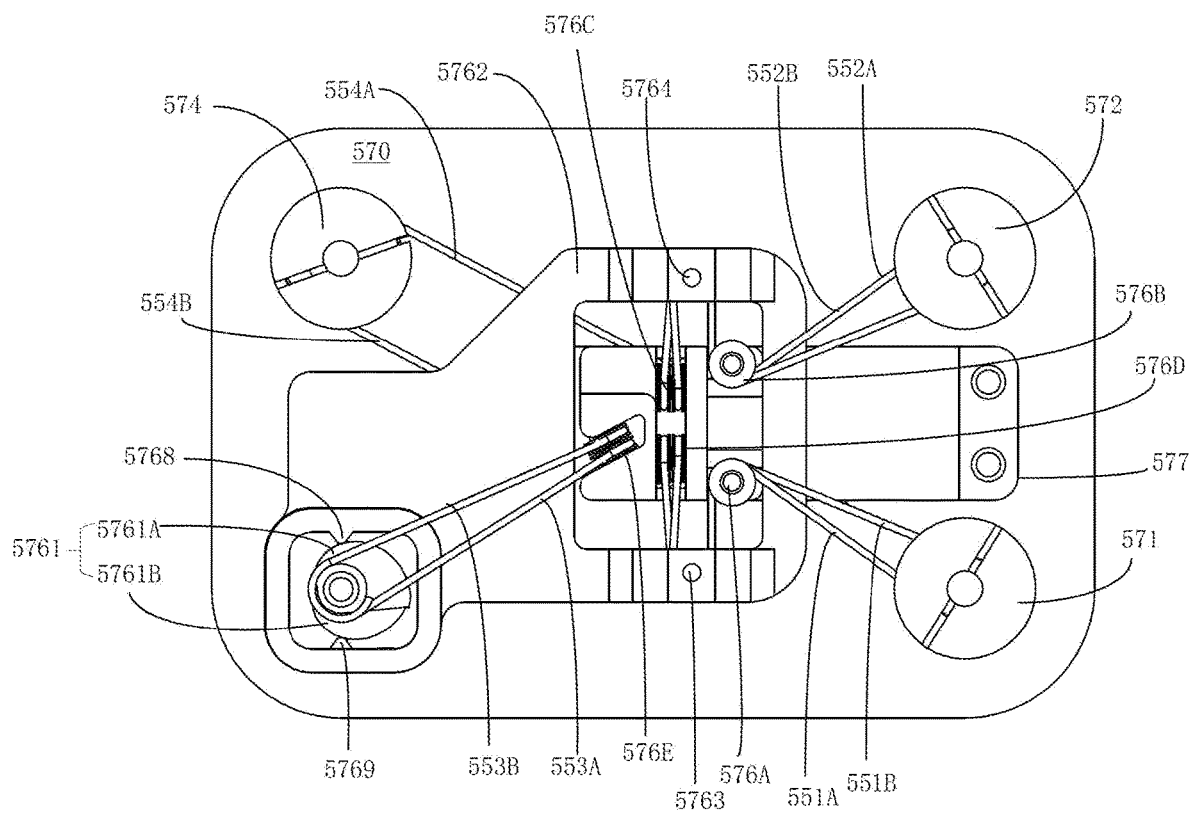
FIG. 12B is a plan view oldie drive device shown in the FIG. 12A.

In order to better show the relationship between the master decoupling member 5761 and the slave decoupling member 5762, FIG. 128 does not show the third drive unit. As shown in FIG. 12B, the drive device 570 further includes a mounting base 577 and a decoupling mechanism disposed on the mounting base 577, the decoupling mechanism includes a r aster decoupling member 5761 and a slave decoupling member 5762, the master decoupling member 5761 and the third drive unit 573 are disposed on the same rotating shaft 573A, the master decoupling member 5761 is a cam rotating at the same angular velocity as the third drive unit 573, and the slave decoupling member 5762 includes a sliding frame 5765 and a first guide portion 5763 and a second guide portion 5764 mounted on the sliding frame 5765, similarly to the previous embodiment, the drive device 570 further comprises a first guide wheel 576A, a second guide wheel 576B, a third guide wheel 576C, and a fourth guide wheel 576D disposed on the mounting base 577. The rotation axis of the first guide wheel 576A is parallel to the rotation axis of the first guide portion 5763, and the rotation axis of the fourth guide wheel 576D is perpendicular to the rotation axis of the first guide wheel 576A and the rotation axis of the first guide portion 5763. The rotation axis of the second guide wheel 576 is parallel to the rotation axis of the second guide portion 5764, and the rotation axis of the third guide wheel 576C is perpendicular to the rotation axis of the second guide wheel 576B and the rotation axis of the second guide portion 5764. After being redirected by the first guide wheel 576A, the first drive cable 151A and the second drive cable 151B are guided by the first guide portion 5763 of the slave decoupling member 5762 and then are guided by the fourth guide wheel 576D, and then leave the drive device 570 and enter into the elongate shaft 160. After being redirected by the second guide wheel 5768, the third drive cable 152A and the fourth drive cable 152B are guided by the second guide portion 5764 of the slave decoupling member 5762 and then are guided by the third guide wheel 5760, and then leave the drive device 570 and enter into the elongate shaft 160, and the fifth drive cable 153A and the sixth drive cable 1538 are redirected by the fifth guide wheel 576E and then enter into the elongate shaft 160.

Figure 12C:
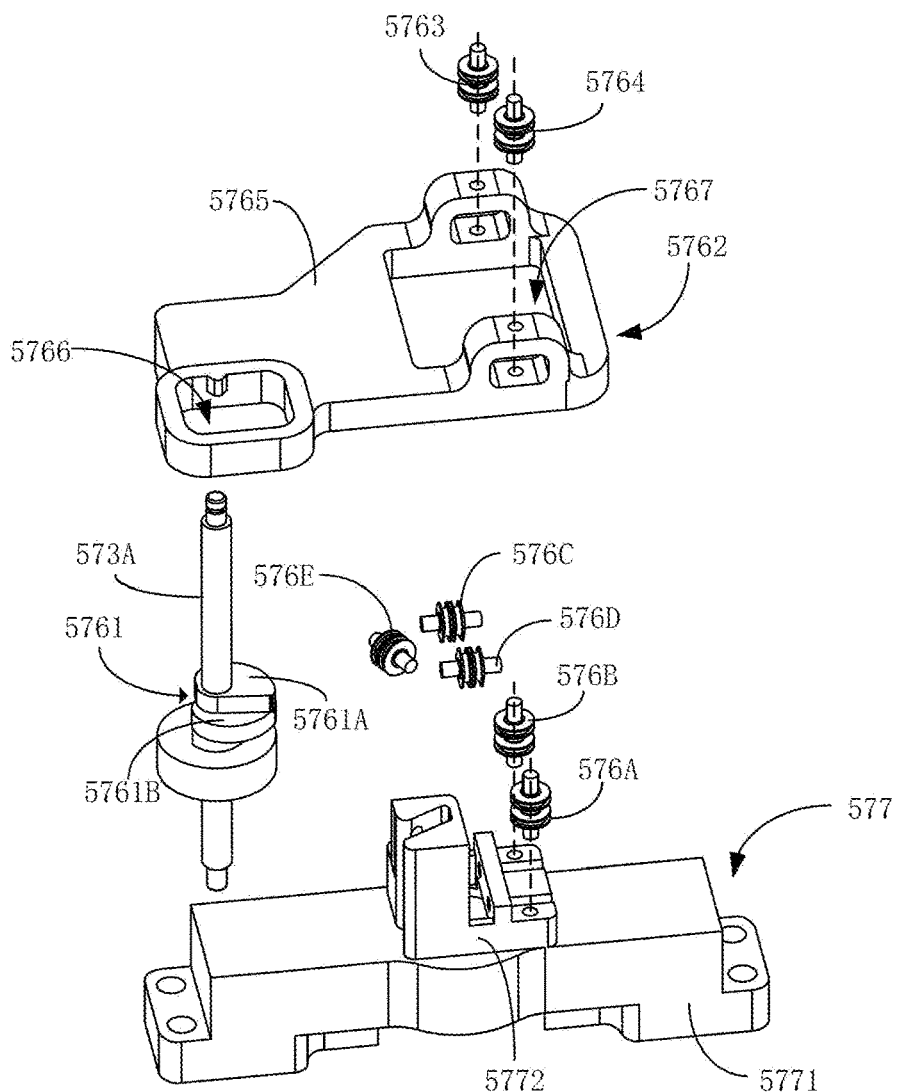
FIG. 12C is an exploded view of a slave decoupling member and the base shown in the FIG. 12A.

As shown in FIG. 12C, the mounting base 577 includes a first boss 5771 and a second boss 5772, the mounting base 577 is mounted to the main body 578 through the first boss 5771, and the first guide wheel 576A, the second guide wheel 576B, the third guide wheel 576C, the fourth guide wheel 576D, and the fifth guide wheel 576E are all mounted on the second boss 5772. The slave decoupling member 5762 includes a sliding frame 5765 and a first guide portion 5763 and a second guide portion 5764 mounted on the sliding frame 5765, the first guide portion 5763 is configured to connect the first drive cable 151A, the second drive cable 151B, and the slave decoupling member 5762, and the second guide portion 5764 is configured to connect the third drive cable 152A, the fourth drive cable 152B, and the slave decoupling member 5762. The sliding frame 5765 includes a first, opening 5766 and a second opening 5767, the first opening 5766 is configured to accommodate the master decoupling member 5751, the second opening 5767 is configured to accommodate the second boss 5772 of the mounting base 577, and the side wall of the second boss 5772 cooperates with the side wall of the second opening 5767 to limit the movement of the sliding, frame 5765 in the vertical sliding direction.

Figure 12D:
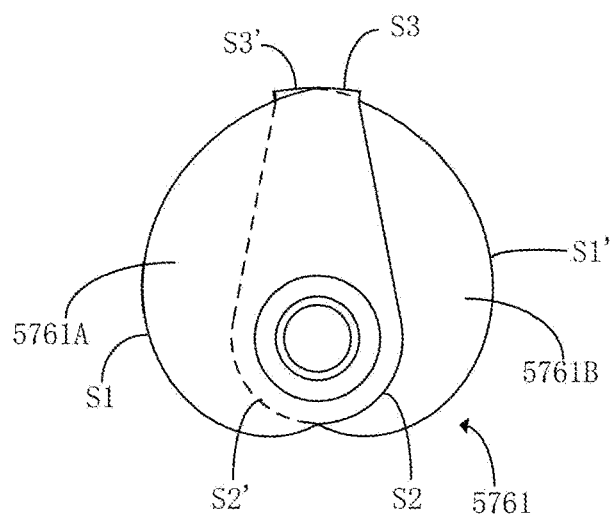
FIG. 12D is a plan view of a master decoupling member shown in the FIG. 12A.

Returning to FIG. 12B, the sliding fame 5765 extends into the first opening 5766 with a first convex body 5768 and a second convex body 5769, the master decoupling member 5761 is contacted with the first convex body 5758 and the second Convex body 5769 in the first opening 5766, and the first convex body 5768 and the second convex body 5769 can move on the outer contour of the master decoupling member 5761 when the taster decoupling member 5761 rotates, so that the sliding frame 5765 slides on the mounting base 577. As shown in FIG. 12D, the master decoupling member 5761 includes a first cam 5761A and a second cam 5761B fixed on the rotating shaft 573A, the first cam 5761A and the second cam 5761B are semi-heart-shaped cams, each have the same outer contour on a plane perpendicular to the rotating shaft 573A, and the outer contour of the first cam 5761A on the plane perpendicular to the rotating shaft 573A includes a heart-shaped involute S1, a first circular arc S2 and a second circular arc S3 located at both ends of the involute S1. The radius of the first circular arc S2 and the radius of the second circular arc S3 are different, the distance between the involute S1 and the axis of the rotating shaft 573A is gradually increased along the direction from the first circular arc S2 to the second circular arc S3, and the involute S1 has the following curve: that is, the variation P of the distance from the axis of the involute S1 to the axis of the rotating shaft 573A is a linear relationship with the angle of rotation of the first cam 5761A along with the shaft 573A, and $P=K1*\theta1+K2$, wherein K1 and K2 are constants, such that when the master decoupling member 5761 rotates at uniform speed, the distance from the contact point of the first convex body 5768 with the involute S1 of the first cam 5761A to the rotating shaft 573A and the distance from the contact point of the second convex body 5769 with the involute S1' of the second cam 5761B to the rotating shaft 573A also linearly change at a constant speed. The first cam 5761A and the second cam 5761B together form a heart-shaped cam-type master decoupling member 5761, the first catty 5761A and the second cam 5761B are staggered up and down in the axial direction of the cam. The first cam 5761A moves in cooperation with the first convex body 5768 of the sliding frame 5765, and the second cam 5761B moves in cooperation with the second convex body 5769 of the sliding frame 5765, so that the main decoupling member 5761 drives the movement of the slave decoupling member to release the coupling relationship between the first pair of cables and the second pair of cables and the third pair of cables.

Figure 12E:
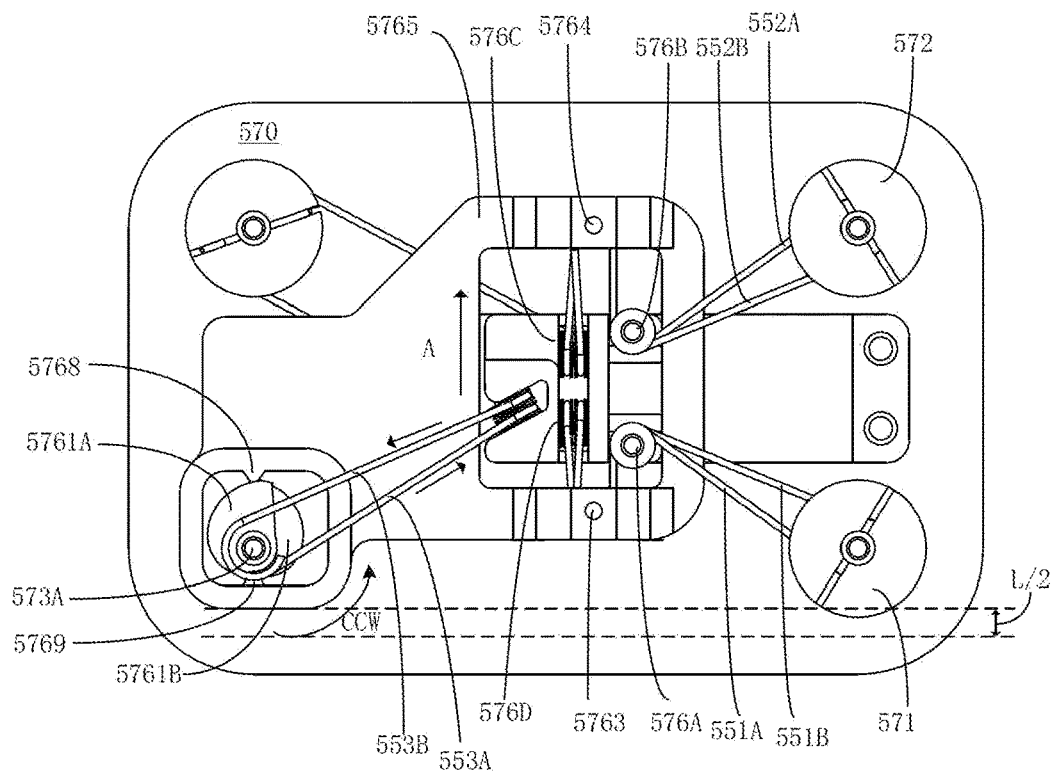
FIG. 12E is a schematic view of decoupling process of the drive device shown in FIG. 12A.

The decoupling process of the drive device 570 is shown in FIG. 12E, the third drive unit 573 (not shown in FIG. 12E) is driven by the actuator to rotate counterclockwise (in the first direction) from the zero position in FIG. 12B to the extreme position in FIG. 12E, during the process, the third drive unit 573 pulls the sixth drive cable 153B and simultaneously releases the fifth drive cable 153A, and at this time the end effector 150 pitches as shown in FIGS. 7A and 7B. Since the master decoupling member 5761 and the third drive unit 573 are disposed on the same rotating shall 573A, the master decoupling member 5761 also moves counter-clockwise, and the first cam 5761A of the master decoupling member 5761 rotates counterclockwise so that the first convex body 5768 moves in a direction of increasing the distance from the involute S1 to the rotating shaft 573A on the involute S1 of the first cam 5761A, and on the contrary, the second cam 5761B of the master decoupling member 5761 rotates counterclockwise so that the second convex body 5769 moves in a direction of decreasing the distance from the involute S1 to the rotating shaft 573A on the involute S1 of the second cam 5761B. Since the inner wall of the second opening 5767 of the sliding frame 5765 is matched with the side wall of the second boss 5772 to limit the movement of the sliding frame 5765 in the direction perpendicular to the A direction, the sliding frame 5765 is driven by the master decoupling member 5761 to move linearly in the A direction.

The sliding frame 5765 also has a first guide portion 5763 connected to the first pair of cables, a second guide portion 5764 connected to the second pair of cables. In order to ensure that the length variation of the first pair of cables and the second pair of tables in the drive device caused by the movement of the sliding frame 5765 is linear, and similar to the embodiments shown in FIGS. 8B and 8C, the movement direction of the sliding frame 5765 is parallel to a portion of the first pair of cables between the first guide wheel 576A and the first guide portion 5763, and a movement direction of the sliding frame 5765 is parallel to a portion of the second pair of cables between the second guide wheel 576B and the second guide portion 5764. The included angles between the straight line along the A direction and the portions of the first drive cable 151A and the second drive cable 1511 between the first guide portion 5763 and the fourth guide wheel 576D are equal. As shown in FIG. 12E, if the sliding flame 5765 is driven by the master decoupling member 5761 to move a distance of L/2 along the A direction, the length of the first drive cable 151A and the length of the second drive cable 151B between the first guiding wheel 576A and the first guide portion 5763 are reduced b L/2, the length between the first guide portion 5763 and the fourth guide wheel 5760 is also reduced by L/2, thus the length of the first drive cable 151A and the second drive cable 151B in the drive device 570 is reduced by L, that is, the length of the first pair of cables in the drive device 570 is reduced by 2L. The length of the third drive cable 152A and the length of the fourth drive cable 152B between the second guide wheel 576B and the second guide portion 5764 are increased by L/2, and the length between the second guide portion 5764 and the third guide wheel 576C is also increased by L/2, so that the length of the third drive cable 152A and the fourth drive cable 152B in the drive device 570 is increased by L, that is, the length of the second pair of cables in the drive device 570 is increased by 2L. Therefore, the decoupling mechanism in the drive device 570 provides a length variation of the drive cable 151A-152B on the end effector 150-side required by the pitching motion of the end effector 150, thereby relieving the coupling relationship between the third pair of cables and the first pair of cables and the second pair of cables, and the movement of the third pair of cables is no longer restricted by the first pair of cables and the second pair of cables, so that the end effector 150 can smoothly perform a pitching operation.

If the master decoupling member 5761 coati fines to rotate so that the sliding frame 5765 moves to an extreme position, at this time, the first convex body 5768 leaves the involute S1 of the first cam 5761A and enters the second circular arc S3, and the second convex body 5769 leaves the involute S1' of the second cam 5761B and enters the first circular arc S2', and because the distance from the contact point of the first convex body 5768 with the first cam 5761A to the rotating shaft 573A is no longer changed when the first convex, body 5768 moves on the first circular arc S2 and the second circular arc S3 of the first cam 5761A, and similarly, the distance from the contact pointe of the second convex, body 5769 with the second cam 5761B to the rotating shaft 573A is no longer changed when the second convex body 5769 moves on the first circular arc S2' and the second circular arc S3' of the second cam 5761B, so that the sliding frame 5765 does not move in the A direction, at this time the sliding frame 5765 is at the extreme position of movement along the A direction, Since the existence of the first circular arc S2, S2' and the second circular arc S3, S3' of the master decoupling member 5761, the master decoupling member 5761 can continue to rotate when rotating to the limit position, and then the sliding frame can continue tea move. Conversely, when the master decoupling member 5761 rotates clockwise, the movement of the first cam 5761A, the second cam 5761B and the sliding frame is opposite to the counter-clockwise movement of the master decoupling member 5761, which will not be repeated here.

FIGS. 13A-13E is a drive device 670 according to an embodiment of the present disclosure, the drive device 670 includes a body 678, and a first drive unit 671, a second drive unit 672, a third drive unit 473, and a fourth drive unit 674 disposed on the body 678. The first drive unit 671 is wound with one end of the first pair of cables, the proximal ends of the first drive cable 151A and the second drive cable 151B are wound around the first drive unit 671 in an opposite manner, the proximal ends of the third drive cable 152A and the fourth drive cable 152B are wound on the second drive unit 672 in an opposite manner, and the proximal ends of the fifth drive cable 153A and the sixth drive cable 153B are wound on the third drive unit 673 in an opposite manner.

The drive device 670 further includes a mounting base 677And a decoupling mechanism 676, the mounting: base 677 is mounted on the body 678, and the decoupling mechanism 676 is mounted on the mounting base 677. The decoupling mechanism comprises a master decoupling member 6761 and a slave decoupling member, the master decoupling member 6761 is a gear coaxially rotating with the third drive unit 673, the slave decoupling member comprises a transmission wheel 6762 and a decoupling the decoupling slider comprises a first decoupling slider 6764 and a second decoupling slider 6765, the first decoupling slider 6764And the second decoupling slider 6765Are separated from each other and move independently of each other, and the transmission wheel 6762 is connected with the first decoupling slider 6764 through the first decoupling, cable 6766, the transmission wheel 6762 is connected to the second decoupling slider 6765 through the second decoupling cable 6767, the first decoupling slider 6764And the second decoupling slider 6765Can move relative to each other, and the angle between the motion direction of the first decoupling slider 6764 and the motion direction of the second decoupling slider 6765 is greater than 900. The transmission wheel 6762 includes a coaxially arranged winch 6762A and a transmission gear 6762B, and the transmission gear. 6762B is engaged with the master decoupling member 6761 through the intermediate gear 6763. The transmission wheel 6762 is driven by the master decoupling member 6761 and manipulates the movement of the first decoupling slider 6764And the second decoupling slider 6765 through the first decoupling cable 6766 and the second decoupling cable 6767. In some other embodiments, the intermediate gear 6763 may not be provided between the transmission wheel 6762 and the master decoupling member 6761, and the transmission wheel 6762 is in direct gear engagement with the master decoupling member 6761.

After being redirected by the first guide wheel 677A, the first drive cable 151A and the second drive cable 151B pass through the first decoupling slider 6764And then enter the elongate shah 160 after being guided by the third guide wheel 677C, and the third drive cable 152A and the fourth drive cable 152B are redirected by the second guide wheel 677B and then enter the elongate shaft 160 after passing through the fourth guide wheel 6770, and the fifth drive cable 153A and the sixth drive cable 153B are redirected by the fifth guide wheel 677E and then directly enter the elongate shaft 160.

One end of the first decoupling cable 6766 is fixed on the winch 6762A, and the other end is redirected by the sixth guide wheel 6768 and then connected to the first decoupling slider 6764. One end of the second decoupling cable 6767 is fixed to the winch 6762A in an opposite winding manner, and the other end is redirected by the seventh guide wheel 6769 and then connected to the second decoupling slider 6765. The first decoupling cable 6766 and the second decoupling cable 6767 respectively control the first decoupling slider 6764And the second decoupling slider 6765 to slide on the mounting base 677 to change the length of the first pair of cables and the second pair of cables in the drive device 670. Therefore, the coupling relationship between the third pair of cables and the first and second pair of cables is removed. It can be understood that in some other embodiments, the first decoupling cable and the second decoupling cable may also be connected to the first decoupling slider and the second decoupling slider without passing through the guide wheels, but using other redirection components such as a curved catheter.

Figure 13A:
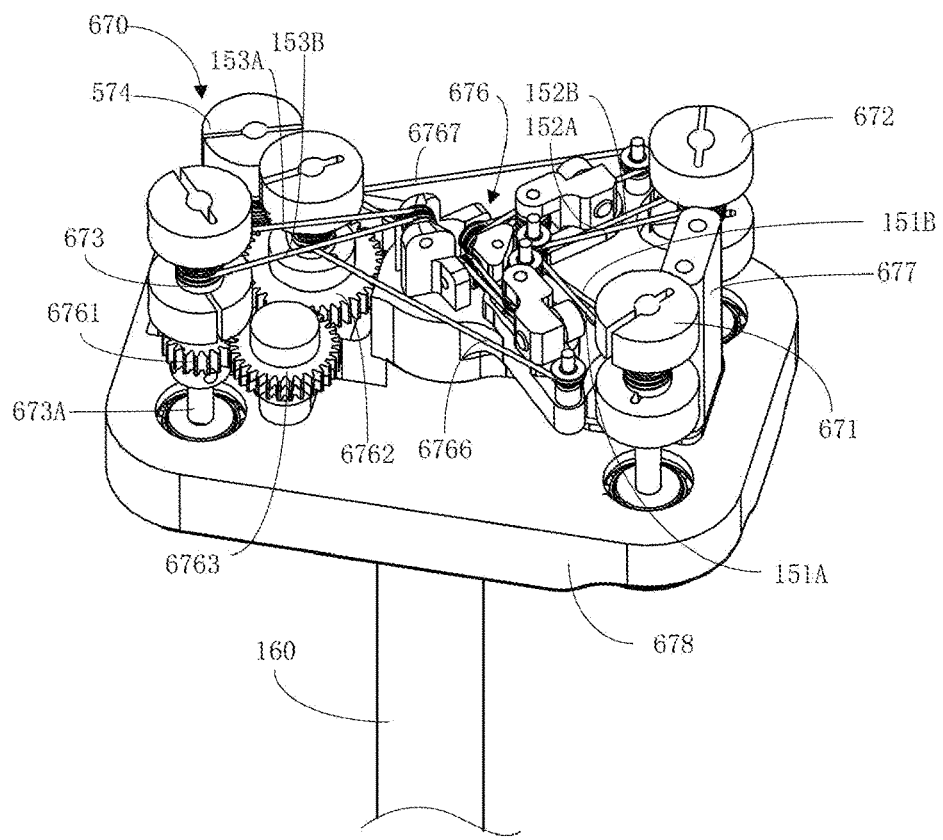
FIG. 13A is a perspective view of a drive device according to an embodiment of the present disclosure.
Figure 13B:
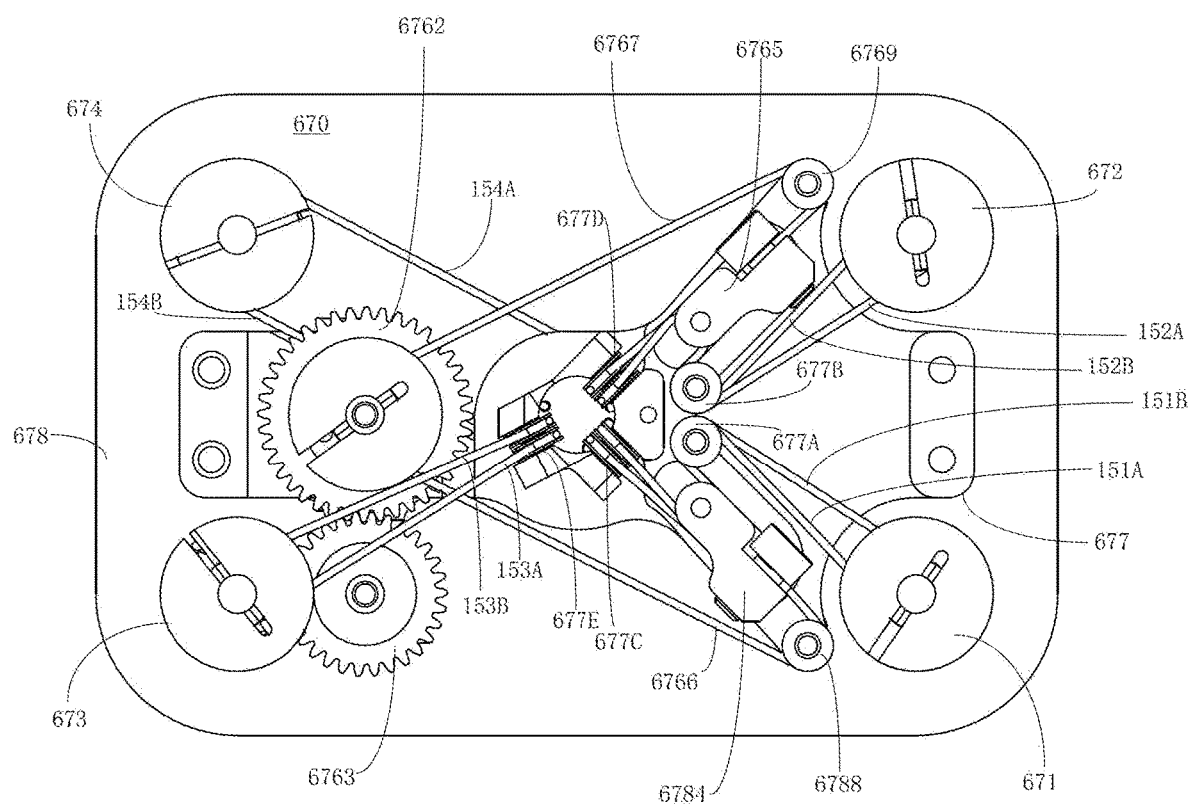
FIG. 13B is a plan view of the drive device shown in the FIG. 13A.
Figure 13C:
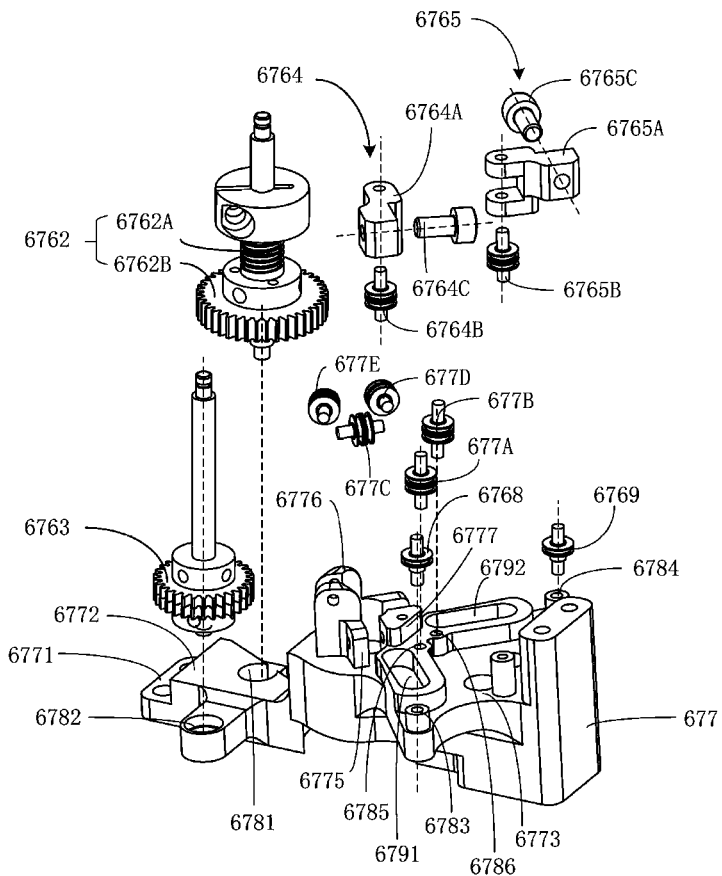
FIG. 13C is an exploded view of a slave decoupling member and the base shown in the FIG. 13A.

FIG. 13C is an exploded view of the mounting base 677 and the slave decoupling member, and FIG. 13C shows the mounting relationship between the slave decoupling member and the mounting base 677 more clearly, the mounting base 677 has a first boss 6771, and the mounting base 677 is mounted on the body 678 through the first boss 6771, the first boss 6771 has a second boss 6772 and a third boss 6773, the second boss 6772 has a first mounting: hole 6781 and a second mounting hole 6782, the rotating shaft of the transmission wheel 6762 of the slave decoupling member is mounted in the first mounting hole 6781, and the rotating shaft of the intermediate gear 6763 is mounted in the second mounting hole 6782, the transmission wheel 6762 is engaged with the intermediate gear 6763 through the transmission gear 676211 to receive the driving force from the master decoupling member 6761. The third boss 6773 has a third mounting hole 6783, a fourth mounting hole 6784, a fifth mounting bole 6785, and a sixth mounting hole 6786, the third mounting hole 6783 is used for mounting the sixth guide wheel 6768 to the third boss 6773, the fourth mounting hole 6784 is used for mounting the seventh guide wheel 6769 to the third boss 6773, the fifth mounting hole 6785 is used for mounting the first guide wheel 677A to the third boss 6773, and the sixth mounting hole 6786 is used for mounting the second guide wheel 677B to the third boss 6773. The third boss 6773 is further provided with a first sliding groove 6791 and a second sliding groove 6792, there is an acute angle between the first sliding groove 6791 and the second sliding groove 6792 to reduce the volume occupied by the mounting base 677, the first sliding groove 6791 and the second sliding groove 6792 are respectively used for accommodating the first decoupling slider 6764 and the second decoupling slider 6765, and the first decoupling slider 6764 and the second decoupling slider 6765 can slide in the first sliding groove 6791 and the second sliding groove 6792. The third boss 6773 is further provided with a first convex block 6775, a second convex block 6776 and a third convex block 6777. The first convex block 6775, the second convex block 6776, and the third convex block 6777 are enclosed to form a guide through hole for guiding the drive cable into the elongate shaft 160. The mounting groove for installing the fifth guide wheel 677E is formed between the first convex block 6775 and the second convex block 6776. The mounting groove for installing the fourth guide wheel 677D is formed between the second convex block 6776 and the third convex Nock 6777. The mounting groove for installing the third guide wheel 677C is formed between the first convex block 6775 and the third convex block 6777. The third guide wheel 677C, the fourth guide wheel 677D and the fifth guide wheel 677E are respectively configured to guide the first pair of cables, the second pair of cables, and the third pair of cables into the guide through hole.

Figure 13D:
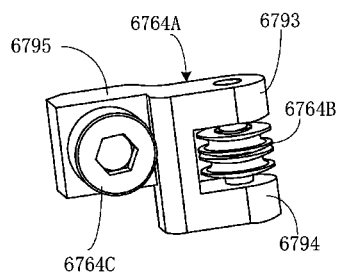
FIG. 13D is a perspective view of a first decoupling slider.

The first decoupling slider 6764 of the slave decoupling member includes a first slider body 6764A, a first guide portion 6764B mounted on the first slider body 6764A and a first fastener 6764C, the first guide portion 6764B is configured for guiding the first drive cable 151A and the second pair of cables 151B, the first fastener 6764C is used to fix the first decoupling cable 6766 to the first decoupling slider 6764 so that the transmission wheel 6762 can manipulate the first decoupling slider 6764 through the first decoupling cable 6766. The second decoupling slider 6765 includes a second slider body 6765A, a second guide portion 6765B mounted on the second slider body 6765A and a second fastener 6765C. The second guide portion 6765B of the second decoupling slider 6765 is configured to guide the third drive cable 152A and the fourth drive cable 152B, and the second fastener 6765C is configured to fix the second decoupling cable 6767, in addition, the decoupling arrangement of the second decoupling slider 6765 and the first decoupling slider 6764 is substantially the same, and FIG. 13D further shows details of the first decoupling slider. As shown in FIG. 13D, the first slider body 6764A of the first decoupling slider 6764 includes a first protrusion 6793 and a second protrusion 6794 disposed opposite to the first protrusion 6793, the first guide portion 6764B is mounted between the first protrusion 6793 and the second protrusion 6794, and the same as the above-mentioned embodiment, the first guide portion 6764B also has two pulleys arranged side by side, and the two pulleys are respectively configured to guide the first drive cable 151A and the second drive cable 151B. The opposite side of the first protrusion 6793 and the second protrusion 6794 on the first decoupling slider 6764 is further provided with a third protrusion 6795, the third protrusion 6795 is used for installing the first fastener 6764C, and the first decoupling cable 6766 is fixed between the first fastener 6764C and the third protrusion 6795 by the first fastener 6764C.

Figure 13E:
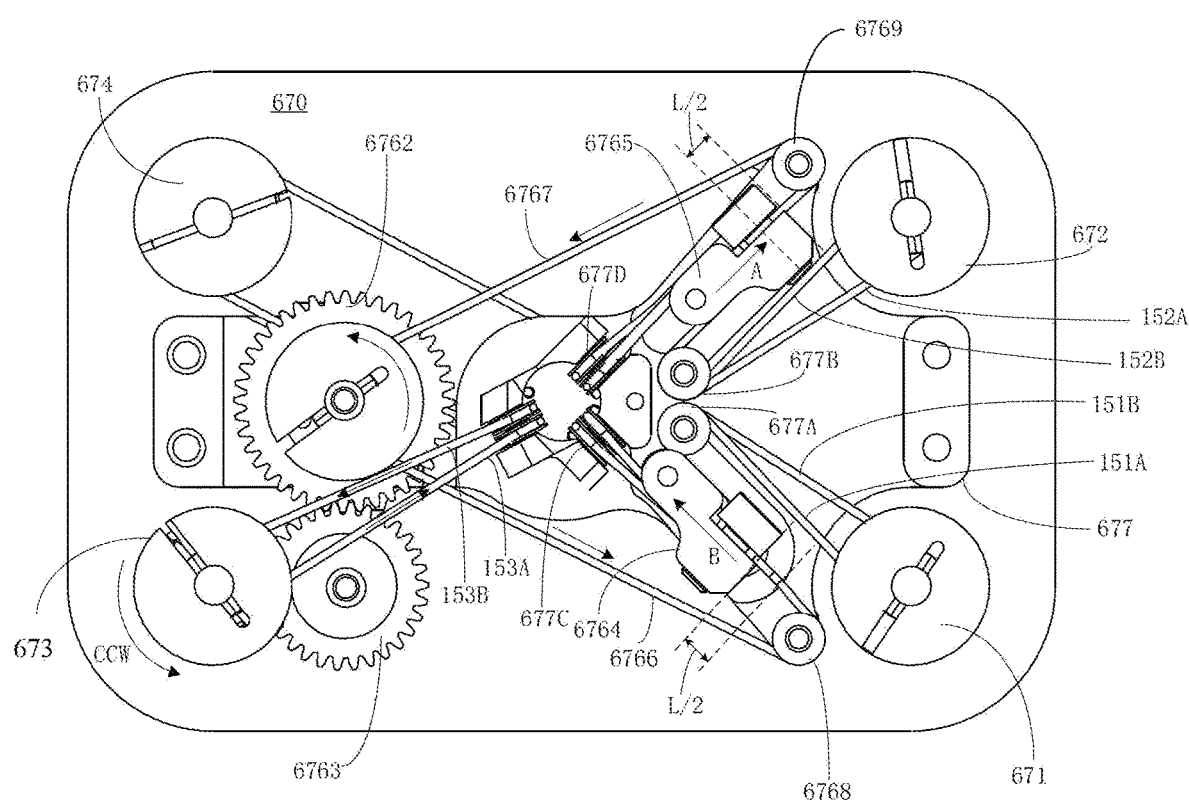
FIG. 13E is a schematic view of decoupling process of the drive device shown in FIG. 13B FIGS. 14A-14C are schematic views of a drive device according to at embodiment of the present disclosure.

The decoupling process of this embodiment is shown FIG. 13E, when the third drive unit 673 is driven by the actuator to rotate counterclockwise along with the shaft 673A, since the master decoupling member 6761 and the third drive unit 673 are connected to the actuator through the same shaft 673A, (the master decoupling member 6761 is obscured by the third drive unit 673 and cannot be seen in FIG. 13E), at this time, the master decoupling member 6761 and the third drive unit 673 rotate counterclockwise (the first direction) along with the shaft 673A at the same annular velocity, the third drive unit 673 pulls the sixth drive cable 153B and simultaneously releases the fifth drive cable 153A, so that the end effector 150 performs the pitching motion shown in FIGS. 7A and 7B. At this time, the master decoupling member 6761 drives the transmission wheel 6762 to rotate counterclockwise through the intermediate gear 6763 engaged with the master decoupling member 6761, so that the transmission wheel 6762 releases the first decoupling cable 6766 and pulls the second decoupling cable 6767 at the same time, making the second decoupling slider 6765 moves L/2 in the A direction relative to the zero position shown in FIG. 13B, and similarly, the first decoupling slider 6764 moves L/2 in the B direction relative to the zero position. Similar to the above embodiment, the moving direction of the first decoupling slider 6764 is parallel to the parts of the first drive cable 151A and the second drive cable 151B between the first guide wheel 677A and the first decoupling slider 6764, The length variation of the first drive cable 151A and the second drive cable 151B between the first guide wheel 677A and the first decoupling slider 6764 is in a linear relationship with the variation of the movement distance of the first decoupling slider 6764, so that the length of the first drive cable 151A and the second drive cable 151B between the first guide wheel 677A and the first decoupling slider 6764 is reduced by L/2, and similarly, the length between the third guide wheel 677C and the first decoupling slider 6764 also reduces L/2, so that the length of the first drive cable 151A and the second drive cable 151B within the drive device 670 is reduced by L, that is, the length of the first pair of cables within the drive device is reduced by 2L. Similarly, the parts of the third drive cable 152A and the fourth drive cable 152B between the second guide wheel 677B and the second decoupling slider 6765 is parallel to the direction of movement of the second decoupling slider 6765, the length of the third drive cable 152A and the fourth drive cable 152B between the second guide wheel 677B and the second decoupling slider 6765 is parallel to the movement direction of the second decoupling slider 6765, and the length of the third drive cable 152A and the fourth drive cable 152B between the second guide wheel 677B and the second decoupling slider 6765 increases L/2, so that the length of the third drive cable 152A and the length of the fourth drive cable 152B in the drive device 670 is increased by L, that is, the length of the second pair of drive cables in the drive device is increased by 2L. Therefore, the decoupling mechanism 676 in the drive device 670 provides a length variation of the drive cable 151A-152B on the end effector 150-side required by the pitching motion of the end effector 150, thereby relieving the coupling relationship between the third pair of cables and the first pair of cables and the second pair of cables, and the movement of the third pair of cables is no longer restricted by the first pair of cables and the second pair of cables, so that the end effector 150 can smoothly perform the pitch operation.

Figure 14A:
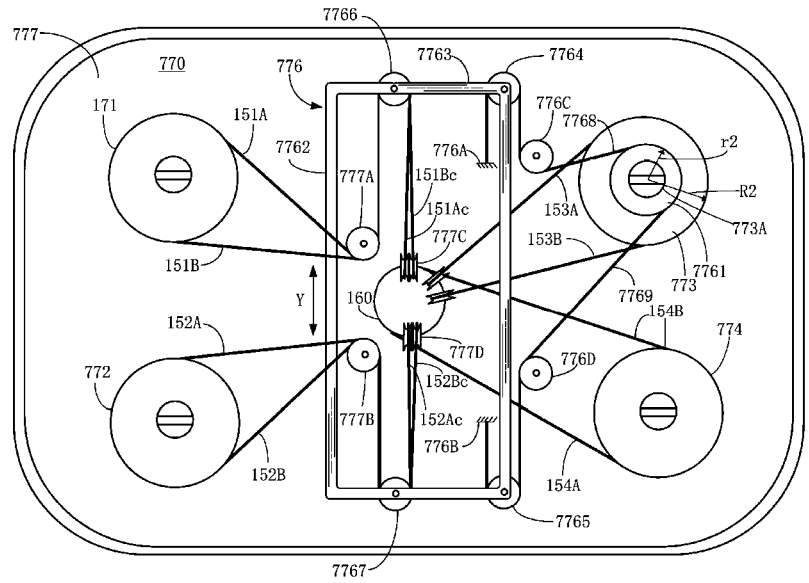

As shown is FIG. 14A, which is a schematic diagram of a drive device 770 according to an embodiment of the present disclosure, the drive device 770 includes a body 777, a first drive unit 771 and a second drive unit 772 arranged on the body for driving the end effector 150 to perform open, close and yaw motions, a third drive unit 773 configured to drive the end effector 150 to pitch, and a fourth drive unit 774 configured to drive the elongate shaft 160 to rotate. The proximal ends of the first drive cable 151A and the second drive cable 151B of the first pair of cables 151 are wound on the first drive unit 771 in opposite winding manners, respectively. The proximal ends of the third drive cable 152A and the fourth drive cable 152B of the second pair of cables 152 are wound an the second drive unit 772 in opposite winding manners, respectively. The proximal ends of the fifth drive cable 153A and the sixth drive cable 153B of the third pair of cables 153 are wound on the third drive unit 773 in opposite winding manners, respectively. And the seventh drive cable 154A and the eighth drive cable 154B of the fourth pair of cables are wound on the fourth drive unit 774 in an opposite winding manner respectively.

When the actuator in the instrument mounting frame 132 drives the first drive unit 771 to rotate, the first drive unit 771 pulls or releases the first drive cable 151A or the second drive cable 151B to rotate the first jaw 230 around the third pin 313, and when the actuator in the instrument mounting frame 132 drives the second drive unit 772 to rotate, the second drive unit 772 pulls or releases the third drive cable 152A or the fourth drive cable 152B to rotate the second jaw 240 around the third pin 313, the first jaw 230 and the second jaw 240 rotate around the third pin 313 so that the end effector 150 performs opening and closing and/or yaw motions. When the actuator in the instrument mount 132 drives the shaft 773A to rotate to drive the third drive unit 773, the third drive unit 773 pulls or releases the fifth drive cable 153A or the sixth drive cable 153B to cause the second support member 220 to rotate around the axis AA' of the second pin 312, thereby implementing, the pitch movement of the end effector 150. When the actuator in the instrument mounting frame 132 drives the fourth drive unit 774 to rotate, the fourth drive unit 774 pulls or releases the seventh drive cable 154A or the eighth drive cable 154B to realize the self-rotating motion of the elongate shaft 160.

The drive device 770 further includes a decoupling mechanism 776 for releasing a coupling relationship between the third pair of cables 153 and the first pair of cables 151 and the second pair of cables 152 on the end effector 150-side, the decoupling mechanism 776 includes a master decoupling member 7761 and a slave decoupling member 7762, the master decoupling member 7761 is arranged coaxially with the third drive unit 773, for example, the master decoupling member 7761 is disposed on the bottom of the shaft 773A, the master decoupling member 7761 is disposed on the upper portion of the shaft 773A, and in other embodiments, the main decoupling member 7761 may also be at the bottom of the shaft 773A, and the third drive unit 773 is located at the upper part of the shaft 773A.

The slave decoupling member 7762 includes a sliding frame 7763 and decoupling cables. The sliding frame 7763 is slidably arranged on the main body 777. The two ends of the sliding frame 7763 are respectively provided with a first guide member 7764 and a second guide member 7765 for guiding the decoupling cables. The decoupling cables includes a first decoupling cable 7768 and a second decoupling cable 7769. One end of the first decoupling cable 7668 is wound around the master decoupling member 7761, and the other end of the first decoupling cable 7768 is fixed to the first fixing portion 776A on the main body 777 after being guided by the first guide member 7764. One end of the second decoupling cable 7769 is wound around the master decoupling member 7761 in an opposite winding direction of the first decoupling cable 7768, and the other end of the second decoupling cable 7769 is fixed on the second fixing portion 776B on the main body after being guided by the second guide member 7765. Since the master decoupling member 7761 and the third drive unit 773 are disposed on the same shaft 773A, when the third drive unit 773 rotates, the master decoupling member 7761 also rotates at the same angular velocity so as to pull or release the first decoupling cable 7768, and release or pull the second decoupling cable 7769, so that the master decoupling member 7761 pulls the sliding frame 7763 to slide on the main body 777. Compared with the first decoupling cable 7768 and the second decoupling cable 7769 are directly fixed on the main body 777, the first decoupling cable 7768 and the second decoupling cable 7769 are fixed on the main body 777After being guided by the first guide member 7764 and the second guide member 7765, respectively, so that the first guide member 7764 and the second guide member 7765 act as movable pulleys, so that master decoupling member 7761 can drive the movement of the sliding frame 7763 through decoupling cables with a smaller driving force, thereby reducing the load of driving the third drive unit 773 and the master decoupling member 7761.

The sliding flame 7763 is further provided with a first guide portion 7766 and a second guide portion 7767 for guiding the first pair of cables 151 and the second pair of cables 152, respectively, the first drive cable 151A and the second drive cable 151B of the first pair of cables 151 enter the elongate shaft 160 after being guided by the first guide portion 7766 and extend to the end effector 150, and the third chive cable 152A and the fourth drive cable 152B of the second pair of cables 152 enter the elongate shaft 160 after being guided by the second guide portion 7767 and extend to the end effector 150. The fifth drive cable 153A and the sixth drive cable 153B of the third pair of cables 153 extend all the way through the elongate shaft 160 and are connected to the end effector 150, and how the drive cables 151A-153B are connected to the end effector 150 has been described in detail above, and will not be repeated here.

When the third drive unit 773 and the master decoupling member 7761 rotate together with the shaft 773A, the third drive unit 773 pulls or releases the fifth drive cable 153A and releases or pulls the sixth drive cable 153B, so that the end effector 150 performs a pitching motion, such that both the first pair of cables 151 and the second pair of cables 152 will change the lengths on the end effector 150 and within the drive device 770, while the master decoupling member 7761 simultaneously pulls or releases the first decoupling cable 7768 and releases or pulls the second decoupling cable 7769 to drive the sliding frame 7763 to move. Since both the first pair of cables 151 and the second pair of cables 152 are respectively wound on the first guide portion 7766 and the second guide portion 7767, when the sliding frame 7763 moves the first guide portion 7766 and the second guide portion 7767 on the sliding frame 7763 respectively guide the first pair of cables 151 and the second pair of cables 152 to move in the drive device, so that the third drive unit 773 and the sliding frame 7763 cooperate to change the length of the first pair of cables 151 and the second pair of cables 152 within the drive device. Thus, the length variation of the first pair of cables 151 and the second pair of cables 152 on the end effector 150-side required by the pitching motion of the end effector 150, will be provided by the length variation of the first pair of cables 151 and the second pair of cables 152 in the drive device 770 caused by the cooperation of the third drive unit 773 and the sliding frame 7763, thereby releasing the coupling relationship between the third pair of cables 153 and the first pair of cables 151 and the second pair of cables 152.

For movement of the sliding frame 7763, the sliding frame 7763 is limited to only move linearly in the longitudinal Y-direction shown in FIG. 14A, and there are many ways in, which the sliding frame 7763 is limited to move only in the longitudinal Y-direction, for example, the motion of the sliding frame 7763 in a transverse direction perpendicular to the longitudinal Y-direction is limited by the pulleys that guide the sliding frame, or the sliding frame 7763 is partially located in the slide slot on the body 777 parallel with the longitudinal Y-direction, allowing the sliding frame 7763 to move along the slide slot.

In addition, the length variation of the first pair of cables 151 and the second pair of cables 152 within the drive device 770 caused by the linear movement of the sliding frame 7763 is always linear. Specifically, the drive device 770 further comprises a first guide wheel 777A, a second guide wheel 777B, a third guide wheel 777C, and a fourth guide wheel 777D, the first drive cable 151A and the second drive cable 151B successively pass through the guidance of the first guide wheel 777A, the first guide portion 7766 and the third guide wheel 777C into the elongate shaft 160 and then extend to the end effector 150. The third drive cable 152A and the fourth drive cable 152B successively pass through the guidance of the second guide wheel 777B, the second guide portion 7767 and the fourth guide wheel 777D into the elongate shaft 160 and then extend to the end effector 150, wherein the axis of the first guide wheel 777A is parallel to the axis of the first guide portion 7766, the axis of the third guide wheel 777C is perpendicular to the axis of the first guide wheel 777A and the axis of the first guide portion 7766, the axis of the second guide wheel 777B is parallel to the axis of the second guide portion 7767, and the axis of the fourth guide wheel 7771 is perpendicular to the axis of the second guide wheel 777B and the axis of the second guide portion 7767.

Similar to the embodiments shown in FIGS. 8B-8C, the third decoupling cable segment 151AD and the fourth decoupling cable segment 151Bd are parallel to the movement direction of the sliding frame 7763, so that the velocity of the length change caused by, the linear motion of the first decoupling cable segment 151Ad to the fourth decoupling part cable 152Ad in the decoupling process is directly proportional to the linear motion speed of the sliding frame 7763.

The routing manner of the parts of the second pair of cables 152 between the second guide wheel 777B, the second guide portion 7767 and the fourth guide wheel 777D; and the above-mentioned routing manner of the first pair of cables 151 between the first guide wheel 777A, the first guide portion 7766 and the third guide wheel 777C are the same, which will not be repeated here, so that during the decoupling process, for the part of the third drive cable 152A and the fourth drive cable 152B of the second pair of cables 152 between the second guide wheel 777B and the second guide portion 7767 and the part between the second guide portion 7767 and the fourth wheel 777D, the speed of the length variation of the parts caused by the movement of sliding frame 7763 is directly proportional to the velocity of the sliding frame 7763, that is, the speed of the length variation caused by the movement of sliding frame 7763 of any one of the drive cables 151A-152B in the drive device 770 is directly proportional to the velocity of the sliding frame 7763 in linear motion. In this embodiment, during the decoupling process, the speed of the length variation of any one of the drive cables 151A-152B in the drive device 770 is twice the speed of the linear motion of the sliding frame 7763.

The main body 777 of the drive device 770 is further provided with a first guide sheave 776C and a second guide sheave 776D, and after being guided by the first guide sheave 776C, the first decoupling cable 7768 successively passes through the first guide sheave 776C and the first guide member 7764 and is finally fixed on the first fixing portion 776A of the main body 777. The second decoupling cable 7769 successively passes through the second guide sheave 776D and the second guide member 7765 and is finally fixed on the second fixing portion 776B. During the decoupling process, the movement direction of the sliding frame 7763 along the linear motion is parallel to the part of the first decoupling cable 7768 between the first guide member 7764 and the first fixing portion 776A and the part between the first guide member 7764 and the first guide sheave 776C, and similarly, the movement direction of the sliding frame 7763 is parallel to the part of the second decoupling cable 7769 between the second guide member 7765 and the second fixing portion 776B and the part between the second guide member 7765 and the second guide sheave 776D. Therefore, the sliding speed of the sliding frame 7763 pulled by the first decoupling cable 7768 and the second decoupling cable 7769 in the Y direction shown in FIG. 14A is directly proportional to the linear velocity of the master decoupling member 7761, and since the master decoupling member 7761 and the third drive unit 773 are coaxially arranged, the sliding speed of the sliding frame 7763 is directly proportional to the linear speed of the third drive unit 773.

As described above-mentioned, during, the decoupling process, the speed of the length variation of any one of the drive cables 151A-152B in the drive device 770 is directly proportional to the speed of the linear motion of the sliding flame 7763, therefore, the speed of the length variation of any one of the drive cables 151A-152B in the drive device 770 is directly proportional to the linear velocity of the master decoupling member 7761, and the rotational linear speed of the master decoupling member 7761 is directly proportional to the linear velocity of the third drive unit 773, so in the decoupling process, the speed of the length variation of any one of the drive cables 151A-152B in the drive device 770 is also directly proportional to the rotational linear speed of the third drive unit 773. In this embodiment, the speed of the length variation of any one of the drive cables 151A-152B in the drive device 770 due to the linear motion of the sliding frame 7763 is equal to the linear velocity of the master decoupling member 7761, so that the decoupling process is precisely controllable.

Figure 14B:
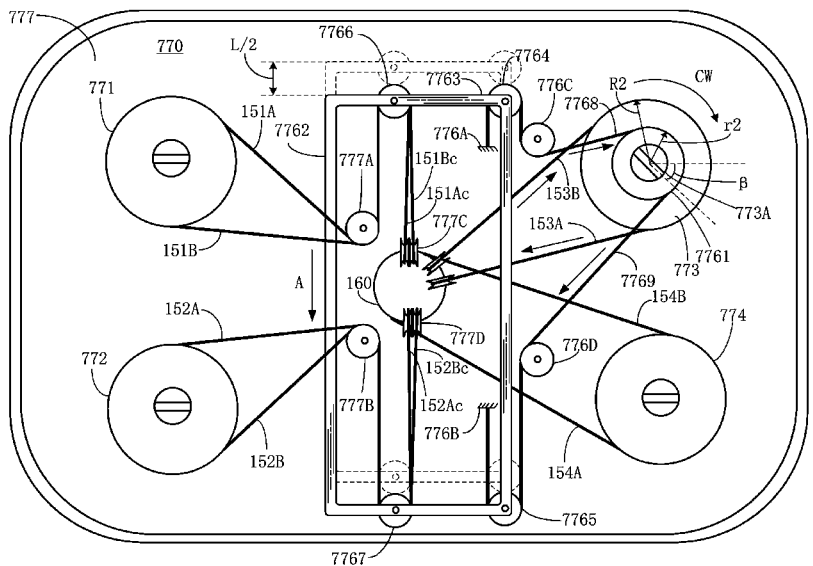

The detailed decoupling process is shown in FIG. 14B, when the third drive unit 773 and the master decoupling member 7761 rotate coaxially in the first direction (clockwise), the third drive unit 773 pulls the sixth drive cable 1531 and simultaneously releases the fifth drive cable 153A, so that the second support member 220 of the end effector 150 rotates around the axis AA' of the second pin 312 as shown in FIGS. 7A and 7B, and the entire end effector 150 performs pitching motion. As described above, in order to enable the end effector 150 to smoothly perform pitching motion, the wrap angle lengths of the first drive cable 151A and the second drive cable 151B respectively on the fifth pulley 215 and the eighth pulley 218 need to be simultaneously increased by L, and the wrap angle lengths of the third drive cable 152A and the fourth drive cable 152B on the sixth pulley 216 and the seventh pulley 277 need to be reduced by L simultaneously to enable the end effector 150 to smoothly perform the pitching motion. Since the master decoupling member 7761 of the decoupling mechanism 776 and the third drive unit 773 rotate coaxially, the master decoupling member 7761 pulls the first decoupling cable 7768 and releases the second decoupling cable 7769 at the same time, if the master decoupling member 7761 rotates the arc length L along the first direction and the corresponding arc is β, and if the radius of the main decoupling part is r2, L=β*r2, correspondingly, the master decoupling member 7761 pulls the first decoupling cable 7768 such that the length of the first decoupling cable 7768 wound around the master decoupling member 7761 is increased by L. Thus, the part of the first decoupling cable 7768 between the first guide member 7764 and the first fixing, portion 776A and the part between the first guide member 7764 and the first guiding, sheave 776C respectively reduce L/2, on the contrary the master decoupling member 7761 releases the second decoupling cable 7769 such that the portion of the second decoupling cable 7769 between the second guide member 7765 and the second fixing portion 776B and the portion between the second guide member 7765 and the second guiding sheave 776D are increased by L/2, respectively, such that the sliding frame 7763 moves the L/2 distance along the A-direction under the traction of the first decoupling cable 7768 and the second decoupling cable 7769.

While the sliding frame 7763 moves in the A-direction, the lengths of the wrapping angles of the first drive cable 151A and the second drive cable 151B on the fifth pulley 215 and the eighth pulley 218 increase respectively due to the pitching motion of the end effector 150, so that the lengths of the first drive cable 151A and the second drive cable 151B in the drive device 770 will be reduced, finally as shown in FIG. 7A, when the end effector 150 is pitched and rotated through the angle α in the direction shown in FIG. 7A, the wrap angle lengths of the first drive cable 151A and the second drive cable 151B on the fifth pulley 215 and the eighth pulley 218, respectively, are simultaneously increased by L, where L=α*r1, while the length of the first drive cable 151A and the length of the second drive cable 151B in the drive device 770 also respectively reduce L. As described above, since the sliding frame 7763 moves L/2 distance along the A-direction, it just allows the first decoupling cable segment 151Ac and the third decoupling cable segment 151Ad of the first drive cable 151A to reduce the length L/2 respectively, that is, the movement L/2 distance of the sliding frame 7763 in the A-direction just allows the first drive cable 151A and the second drive cable 151B to reduce the length L.

On the contrary, the wrapped angle lengths of the third drive cable 152A and the fourth drive cable 152B on the sixth pulley 216 and the seventh pulley 217 respectively decrease the length L. While the sliding frame 7763 moves in the A-direction, and the second guide portion 7767 will guide the third drive cable 152A to increase the length of the part between the second guide wheel 777B and the second guide portion 7767 and the part between the second guide portion 7767 and the fourth guide wheel 777D by L/2, respectively. In addition, the second guide portion 7767 will guide the fourth drive cable 152B to increase the length of the part between the second guide wheel 777B between the second guide portion 7767 and the part between the second guide portion 7767 and the fourth guide wheel 777D by L/2, respectively, that is, the length of the third drive cable 152A and the length of the fourth drive cable 152B in the drive device are increased by L, respectively.

Since the increase in the length of the first pair of cables 151 in the end effector 150 required for the pitching motion of the end effector 150 as shown in FIG. 7A is all provided by the reduced length of the first pair of cables 151 within the drive device, the reduced lengths of the second pairs of cables 152 on one side of the end effector 150 are all transferred to the increased lengths of the second pair of cables 152 within the drive device, whereby the decoupling mechanism 776 achieves the decoupling of the coupling relationship between the third pair of cables 153 and the first pair of cables 151 and the second pair of cables 152, and the movement of the third pair of cables 153 is no longer limited by the first pair of cables 151 and the second pair of cables, and the end effector 150 smoothly performs the pitching action shown in FIG. 7A.

During the above-mentioned whole decoupling process, since the length change of the first pair of cables 151 within the drive device and the movement of the sliding frame 7763 are independently driven by different driving forces, the length change of the first pair of cables 151 within the drive device is driven by the pitch motion of the end effector 150, and the movement of the sliding frame 7763 is driven by the master decoupling member 7761. During the decoupling process of the movement of the sliding frame 7763 along the A-direction, the first pair of cables 151 is no stressed on the first guide portion 7766, and since the second pair of cables 152 are also synchronously released in the drive device 770 during the movement of the sliding frame 7763 in the A direction, during the decoupling process, the second pair of cables 152 is also substantially unstressed on the second guide portion 7767, so that the service life of the drive cable can be prolonged, and the tension of the first pair of cables 151 and the second pair of cables 152 can also be kept constant.

Returning again to FIG. 7A, the radius of the groove bottom of the annular groove 319A on the pitch wheel 319 of the second support member 220 for accommodating and guiding the fifth drive cable 153A and the sixth drive cable 153B is R1, and when the end effector 150 is pitching, the fifth drive cable 153A or the sixth drive cable 153B can form a wrapped angle in the annular groove. During the rotation of the end effector 150 by an angle α angle from the zero state shown in FIG. 5D to the state shown in FIG. 7A, the wrapped angle length of the fifth drive cable 153A in the annular groove 319A on the pitch wheel 319 increases L1, while the wrapped angle length of the sixth drive cable 153B in the annular groove 319A on the pitch wheel 319 reduces L1, where L1=R1, since the pitching motion of the end effect r 150 is driven by the third drive unit 773 within the drive device 770 as shown in FIG. 14B, at this time, the third drive unit 773 rotates the angle β along the first direction (clockwise) to make the end effector 150 pitch motion at an angle α, the third drive unit 773 is that the angle of pitching motion of the end effector 150 is β, the third drive unit 773 releases the fifth drive cable 153A and pulls up the sixth drive cable 153B at the same time, so that the length of the fifth drive cable 153A wound on the third drive unit 773 is reduced by L1, and the length of the sixth drive cable 153B wound on the third drive unit 773 is increased by L1, where L1=*R2. As described above, correspondingly at this time, the master decoupling member 7761 pulls the first decoupling cable 7768 and pulls the second decoupling cable 7769 at the same time, so that the length of the first decoupling cable 7768 wound on the master decoupling member 7761 is reduced by L, that is, the first decoupling cable 7768 is released by L, and the length of the second decoupling cable 7769 wound on the main decoupling member 7761 is increased by L, where so the sliding frame 7763 moves L/2 in the A direction, the lengths of the first drive cable 151A and the second drive cable 151B within the drive device 770 are all reduced by L, on the contrary, the lengths of the third drive cable 152A and the fourth driving cable 152B within the drive device 770 are all increased by L, respectively, and it can be seen from the foregoing that L=α*r1. In summary, through the above-mentioned four formulas: L1=α*R1, L1=β*R2, L=β*r2, L=α*r1, the following relationship can be obtained:

$$\frac{R2}{r2} = \frac{R1}{r1}$$

The above relationship indicates that the ratio of the radius of the third drive unit 773 to the radius of the master decoupling member 7761 is equal to the ratio of the radius of the groove bottom of the annular groove 319A of the pitch wheel 319 to the radius of the second pulley group. It can be understood that, described above the radius of the drive unit and the radius of the main decoupling member both refer to the radius of the part on which the drive cable or the decoupling cable is wound, such as the radius of the winch, the radius of the pulley refers to the groove bottom radius of the pulley, so that the wrapped angle length of the drive cable around the pulley can be calculated, although there are different interpretations of the radius of the pulley in different documents (such as the radius of the bottom groove, the radius of the bottom of the groove), the radius of the pulley in the present disclosure is a parameter used to measure the wrapped angle length of the drive cable around the pulley.

Figure 14C:
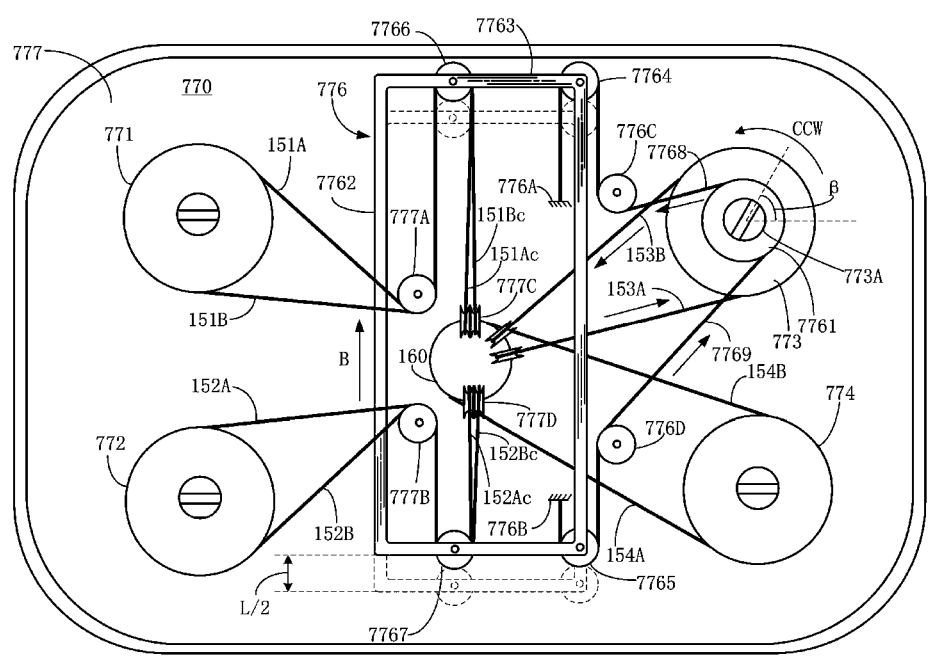

As shown in FIG. 14C, when the third drive unit 773 and the master decoupling member 7761 rotates with the shaft 773A in a second direction (counterclockwise) opposite to the first direction, the third drive unit 773 pulls the fifth drive cable 153A and releases the sixth drive cable 153B, and the master decoupling member 7761 releases the first decoupling cable 7768 and pulls the second decoupling cable 7769 so that the sliding frame 7763 moves the L/2 in the direction B opposite to the direction A. The resulting change in the length of the first pair of cables 151 and the second pair of cables 152 on the end effector 150 and the change in length in the drive device are also opposite to the lengths change of the third drive unit 773 and the master decoupling member 7761 in the first direction shown above, that is, the first drive cable 151A and the second drive cable 151B of the first pair of cables 151 respectively reduce the length L at the wrapped angle lengths on the fifth pulley 215 and the eighth pulley 218, and the third drive cable 152A and the fourth drive cable 152B of the second pair of cables 152 respectively increase the length L at the wrapped angle lengths on the sixth pulley 216 and the seventh pulley 277. The lengths of the first drive cable 151A and the second drive cable 151B in the drive device 770 are respectively increased by L, the length of the third drive cable 152A and the length of the fourth drive cable 152B in the drive device 770 are respectively reduced by L, the specific calculation process may refer to the above-mentioned specific description of the third drive unit 773 and the main decoupling member 7761 along the first direction, which will not be repeated here. Therefore, since the length reduction of the first pair of cables 151 in the end effector 150 required for the pitching motion of the end effector 150 in the opposite direction as shown in FIG. 7A is all transferred to the length increase of the first pair of cables 151 in the drive device 770, the required increase in the length of the second pair of cables 152 on the end-effector 150-side, is provided by the length reduction of the second pair of cables 151 in the drive device, so that the decoupling mechanism 776 achieves the release of the coupling relationship between the third pair of cables 153 and the first pair of cables 151 and the second pair of cables 152, and the movement of the third pair of cables 153 is no longer restricted by the first pair of cables 151 and the second pair of cables 152. The e d effector 150 smoothly performs a pitching action in the opposite direction as shown in FIG. 7A.

The above-mentioned embodiments only express several embodiments of the present disclosure, and the description thereof is more specific and detailed, but it should not be understood as limiting the patent scope of the invention. It should be noted that, for a person skilled in the art, several variations and improvements can be made without departing, from the concept of the present disclosure, all of which belong to the protection scope of the present disclosure. Therefore, the scope of protection of the present disclosure should be based on the appended claims.

What is claimed is:

1. A surgical instrument, comprising:
   an end effector, a drive device, and a plurality of cables, the drive device configured to drive the end effector to move through the plurality of cables, the plurality of cables comprising a first pair of cables, a second pair of cables, and a third pair of cables, the first pair of cables and the second pair of cables configured to drive the end effector to perform a yaw motion, the third pair of cables configured to drive the end effector to perform a pitch motion,
   the drive device comprising:
      a drive unit, an end of the third pair of cables connected to the drive unit, the drive unit configured to drive the end effector to perform the pitch motion through the third pair of cables; and
      a decoupling mechanism, comprising a master decoupling member and a slave decoupling member, the master decoupling member being coaxial with the drive unit, the master decoupling member configured to rotate coaxially with the drive unit and drive the slave decoupling member to move so as to increase a length of one pair of cables of the first pair of cables and the second pair of cables within the drive device and reduce a length of the other pair of cables within the drive device, thereby causing the drive unit to drive the end effector to perform the pitch motion.

2. The surgical instrument of claim 1, wherein the drive unit and the master decoupling member rotate in a first direction to increase the length of the first pair of cables on the end effector and reduce the length of the second pair of cables on the end effector, and the slave decoupling member is driven by the master decoupling member to move so as to reduce the length of the first pair of cables within the drive device and increase the length of the second pair of cables within the drive device;

the drive unit and the master decoupling member further rotate in a second direction opposite to the first direction to reduce the length of the first pair of cables on the end effector and increase the length of the second pair of cables on the end effector, and the slave decoupling member is driven by the master decoupling member to move so as to increase the length of the first pair of cables within the drive device and reduce the length of the second pair of cables within the drive device.

3. The surgical instrument of claim 2, wherein one end of the slave decoupling member is provided with a first guide portion, the other end of the decoupling member is provided with a second guide portion, the first pair of cables extends to the end effector after being guided by the first guide portion, the second pair of cables extends to the end effector after being guided by the second guide portion.

4. The surgical instrument of claim 3, wherein the drive unit and the master decoupling member rotate in the first direction or the second direction, such that an amount of change in the length of the first pair of cables or the second pair of cables on the end effector is four times to a movement distance of the slave decoupling member within the drive device.

5. The surgical instrument of claim 3, wherein the drive device further comprises a first guide pulley and a second guide pulley, the first pair of cables is guided by the first guide pulley and then connected to the end effector after being guided by the first guide portion, and the second pair of cables is guided by the second guide pulley and then connected to the end effector after being guided by the second guide portion.

6. The surgical instrument of claim 5, wherein a movement direction of the slave decoupling member is parallel to a part of the first pair of cables between the first guide pulley and the first guide portion of the slave decoupling member.

7. The surgical instrument of claim 6, wherein the drive device further comprises a third guide pulley and a fourth guide pulley, the third guide pulley and the first guide pulley are respectively located on two sides of the first guide portion of the slave decoupling member, the fourth guide pulley and the second guide pulley are respectively located on two sides of the second guide portion of the slave decoupling member, a portion of the first pair of cables between the first guide portion and the end effector extends to the end effector after being guided by the third guide pulley, and a portion of the second pair of cables between the second guide portion and the end effector extends to the end effector after being guided by the fourth guide pulley.

8. The surgical instrument of claim 7, wherein a rate of change in the length of the first pair of cables due to a movement of the slave decoupling member is directly proportional to a linear velocity of rotation of the master decoupling member.

9. The surgical instrument of claim 1, wherein the slave decoupling member comprises a sliding frame and a plurality of decoupling cables, the master decoupling member is connected with the sliding frame through the plurality of decoupling cables, two ends of the sliding frame are respectively provided with a first guide portion and a second guide portion for guiding the first pair of cables and the second pair of cables, and the master decoupling member is configured to rotate coaxially with the drive unit and drive the sliding frame to move through the plurality of decoupling cables.

10. The surgical instrument of claim 9, wherein the plurality of decoupling cables comprise a first decoupling cable and a second decoupling cable, one end of the first decoupling cable and one end of the second decoupling cable are fixed on the sliding frame, the other ends of the first decoupling cable and the second decoupling cable are fixed on the master decoupling member, the master decoupling member is configured for manipulating the sliding frame to move linearly through the first decoupling cable and the second decoupling cable.

11. The surgical instrument of claim 10, wherein the slave decoupling member further comprises a transmission wheel and a plurality of decoupling sliders, the transmission wheel is engaged with the master decoupling member, the plurality of decoupling sliders at least includes a first decoupling slider with a guide portion and a second decoupling slider with another guide portion, the transmission wheel drives the first decoupling slider and the second decoupling slider to move respectively through the first decoupling cable and the second decoupling cable, the first pair of cables is connected to the end effector after being guided by the guide portion of the first decoupling slider, and the second pair of cables is connected to the end effector after being guided by the guide portion of the second decoupling slider, wherein the master decoupling member is configured to drive the transmission wheel to rotate so as to control the first decoupling cable and the second decoupling cable to enable the first decoupling slider and the second decoupling slider to move so as to change the lengths of the first and second pair of cables within the drive device.

12. The surgical instrument of claim 11, wherein the sliding frame has a first convex body and a second convex body, the master coupling member has a first cam and a second cam which are staggered with each other in an axial direction of the master decoupling member, the rotation of the master decoupling member causes the first cam to contact to the first convex body and the second cam to be contacted to the second convex body so as to push the sliding frame to move.

13. The surgical instrument of claim 12, wherein an outer contour of a projection of the first cam and/or the second cam onto a plane perpendicular to a rotational axis of the master decoupling member has an involute, a change of a distance from the involute to the rotational axis of the master decoupling member when the master decoupling member rotates has a linear relation with an angle of rotation of the master decoupling member around the rotational axis.

14. The surgical instrument of claim 13, wherein the outer contour further comprises a first circular arc and a second circular arc located at two ends of the involute, and the distance from the involute to the rotational axis of the master decoupling member is gradually increased from an end of the involute connected to the first circular arc to the other end of the involute connected to the second circular arc.

15. The surgical instrument of claim 14, wherein the drive device further comprises a first guide sheave configured to guide the first decoupling cable, and one end of the first decoupling cable is guided by the first guide sheave and then fixed on a first fixing portion of the drive device after being guided by a first guide member.

16. The surgical instrument of claim 1, wherein the end effector has a first support member, a second support member, a first jaw, and a second jaw, the second support member is rotatably connected to the first support member, both of the first jaw and the second jaw are rotatably connected to the second support member;
- distal ends of the first pair of cables are arranged on the first jaw, distal ends of the second pair of cables are arranged on the second jaw, distal ends of the third pair of cables are connected to the second support member, the first support member has a first pulley group and a second pulley group for guiding the first pair of cables and the second pair of cables, the second pulley group is located between the first pulley group and the first jaw or the second jaw;
- the drive device is configured to drive the first jaw to rotate relative to the second support member through the first pair of cables, drive the second jaw to rotate relative to the support member through the second pair of cables, and drive the second support member to rotate relative to the first support member through the third pair of cables.

17. The surgical instrument of claim 16, wherein a routing manner of the first pair of cables on the first pulley group and the second pulley group is opposite to a routing manner of the second pair of cables on the first pulley group and the second pulley group.

18. The surgical instrument of claim 16, wherein a proximal end of the second support member is provided with an annular groove for accommodating the third pair of cables, a radius of each pulley of the second pulley group is the same as r1, a radius of the master decoupling member is r2, a radius of the drive unit is R2, a radius R1 of a bottom of the annular groove, the radius r1 of the pulley of the second pulley group, the radius r2 of the master decoupling member, and the radius R2 of the drive unit satisfy a following relationship:

$$\frac{R_2}{r_2} = N\frac{R_1}{r_1},$$

wherein N is an even number, and is a number of guide portions of the slave decoupling member for guiding the first pair of cables and the second pair of cables.

19. A slave operating device, comprising:
at least one robotic arm and at least one instrument, the at least one instrument mounted on the at least one robotic arm, the at least one robotic arm configured to manipulate the at least one instrument to move, the at least one instrument comprising an end effector, a drive device, and a plurality of cables, wherein the drive device is configured to drive the end effector to move through the plurality of cables, the plurality of cables comprises a first pair of cables, a second pair of cables, and a third pair of cables, the first pair of cables and the second pair of cables are configured to drive the end effector to perform a yaw motion, the third pair of cables are configured to drive the end effector to perform a pitch motion;
the drive device comprising:
- a drive unit, one end of the third pair of cables connected to the drive unit, the drive unit configured to drive the end effector to perform the pitch motion through the third pair of cables; and
- a decoupling mechanism comprising a master decoupling member and a slave decoupling member, the master decoupling member being coaxial with the drive unit, the master member configured to rotate coaxially with the drive unit and drive the slave unit to move so as to increase a length of one pair of cables of the first pair of cables and the second pair of cables within the drive device and reduce a length of the other pair of cables within the drive device for the drive unit driving the end effector to perform pitch motion.

20. A surgical robot, comprising:
a master operating device and a slave operating device, the slave operating device configured to perform corresponding operations according to instructions of the master operating device, the slave operating device comprising at least one robotic arm and at least one instrument, the at least one instrument mounted on the at least one robotic arm, the at least one robotic arm configured to manipulate the at least one instrument to move, the at least one instrument comprising an end effector, a drive device, and a plurality of cables, the drive device configured to drive the end effector through the plurality of cables, the plurality of cables comprising a first pair of cables, a second pair of cables and a third pair of cables, the first pair of cables and the second pair of cables configured to drive the end effector to perform a yaw motion, the third pair of cables configured to drive the end effector to perform a pitch motion;
the drive device comprising:
- a drive unit, one end of the third pair of cables connected to the drive unit, the drive unit configured to drive the end effector to perform the pitch motion through the third pair of cables; and
- a decoupling mechanism, comprising a master decoupling member and a slave decoupling member, the master decoupling member being coaxial with the drive unit, the master coupling member configured to rotate coaxially with the drive unit and drive the slave decoupling member to move so as to increase a length of one pair of cables of the first pair of cables and the second pair of cables within the drive device and reduce a length of the other pair of cables within the drive device for the drive unit driving the end effector to perform pitch motion.

* * * * *